United States Patent
Minamikawa

(10) Patent No.: US 7,575,079 B2
(45) Date of Patent: Aug. 18, 2009

(54) POWER OUTPUT DEVICE, AND HYBRID VEHICLE EQUIPPED WITH THE POWER OUTPUT DEVICE

(75) Inventor: Koki Minamikawa, Toyota (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 2 days.

(21) Appl. No.: 12/031,306

(22) Filed: Feb. 14, 2008

(65) Prior Publication Data

US 2008/0196955 A1 Aug. 21, 2008

(30) Foreign Application Priority Data

Feb. 15, 2007 (JP) ............... 2007-034542

(51) Int. Cl.
*B60W 10/04* (2006.01)
(52) U.S. Cl. ............... 180/65.285; 180/65.7; 701/22; 903/942; 903/945
(58) Field of Classification Search ............... 180/65.1, 180/65.21, 65.265, 65.275, 65.285, 65.6, 180/65.7; 701/22; 903/930, 940, 942, 945
See application file for complete search history.

(56) References Cited

U.S. PATENT DOCUMENTS 5,684,373 A * 11/1997 Nakata et al. ............... 318/602
6,805,211 B2 * 10/2004 Fujikawa ............... 180/65.25
7,081,060 B2 * 7/2006 Hata et al. ............... 475/5

FOREIGN PATENT DOCUMENTS

| JP | 61-107165 A | | 5/1986 |
|---|---|---|---|
| JP | 63-030716 A | | 2/1988 |
| JP | 2-114879 A | | 4/1990 |
| JP | 9-219906 A | | 8/1997 |
| JP | 11308888 A | * | 11/1999 |
| JP | 2001-141739 A | | 5/2001 |
| JP | 2002-225578 A | | 8/2002 |
| JP | 2005-225578 A | | 8/2005 |
| JP | 2006-250269 A | | 9/2006 |

* cited by examiner

*Primary Examiner*—Christopher P Ellis
*Assistant Examiner*—John D Walters
(74) *Attorney, Agent, or Firm*—Sughrue Mion, PLLC

(57) ABSTRACT

A motor-generator is feedback-controlled by adopting the rotation speed information from a resolver when the rotation speed of a motor-generator is low, and by adopting the rotation speed information from a north marker when the rotation speed thereof is high. If the gradient of change in the rotation speed thereof based on the presently adopted rotation speed information is greater than or equal to a predetermined value, the rotation speed information switching operation is prohibited to prevent the shift shock during the ratio shifting operation of a reduction mechanism. That is, in a construction in which the rotation speed of the motor-generator can be detected via the resolver and the north marker, the power output device capable of properly performing the rotation speed control of the motor-generator and the like by making proper the timing at which the rotation speed information adopted for the control is switched.

27 Claims, 4 Drawing Sheets

POWER OUTPUT DEVICE, AND HYBRID VEHICLE EQUIPPED WITH THE POWER OUTPUT DEVICE

INCORPORATION BY REFERENCE

The disclosure of Japanese Patent Application No. 2007-034542 filed on Feb. 15, 2007, including the specification, drawings and abstract is incorporated herein by reference in its entirety.

BACKGROUND OF THE INVENTION

1. Field of the Invention

The invention relates to a power output device mounted in, for example, a hybrid vehicle that has a plurality of drive sources or the like, and a hybrid vehicle equipped with the power output device. In particular, the invention relates to an improvement in the timing of switching the rotation speed detector adopted to obtain rotation speed information for a driving control of a specific drive source (primer mover), or the like, from one to another of a plurality of rotation speed detectors that can detect the rotation speed of the drive source.

2. Description of the Related Art

A common hybrid drive device for vehicles employs an internal combustion engine, such as a gasoline engine, a diesel engine, etc., and an electric power device, such as an electric motor or a motor-generator, etc., as motive power sources. There are a variety of forms of the combination of an internal combustion engine and an electric power device. For example, the number of the electric power devices employed in a hybrid drive device is not necessarily one, but some hybrid drive devices employ a plurality of electric power devices.

Known hybrid drive devices in which two electric power devices are employed are disclosed in, for example, Japanese Patent Application Publication No. 2002-225578 (JP-A-2002-225578) and Japanese Patent Application Publication No. 2006-250269 (JP-A-2006-250269). In the technologies of these patent applications, an engine and a first motor-generator are mutually linked via a power distribution mechanism that is made up of a single-pinion type planetary gear mechanism. Besides, torque is transmitted from the power distribution mechanism to an output member, and a second motor-generator is linked to the output member via a speed change mechanism (reduction mechanism). Therefore, the output torque of the second motor-generator is applied as assist torque to the output member. The speed change mechanism is constructed by a planetary gear mechanism that can be switched between a direct connection state and a speed reduction state. Therefore, during the direct connection state, the speed change mechanism can apply the torque of the second motor-generator directly to the output member. During the speed reduction state, the speed change mechanism can apply the torque of the second motor-generator to the output member after increasing the torque.

In a vehicle equipped with this type of hybrid drive device, the running of the vehicle can be switched among an engine drive mode in which only the engine is driven, a motor drive mode in which only the motor-generator is used and the motor-generator is driven as an electric motor, and an engine-motor drive mode in which the engine and the motor-generator are both driven, by controlling the driving and stop of the engine and the motor-generator. Betterment in fuel economy, reduction of noise, reduction of exhaust gas, etc., can be achieved. Besides, by controlling the second motor-generator to a power running state and a regenerative state, it is possible to apply positive torque to the output member or apply negative torque to the output member. Furthermore, since the speed reduction state can be set by the speed change mechanism, the second motor-generator can be reduced in torque or reduced in size.

In this type of hybrid vehicle, the output (torque) is controlled by adjusting the electric current supplied to the motor-generator. Therefore, in a situation where the assist in the drive force is provided by operation of the motor-generator, when a gear ratio shifting operation of the speed change mechanism is performed, it is desirable to control the output of the motor-generator so that the shifting operation is smoothly performed without causing a shift shock.

Therefore, the present rotation speed of the motor-generator is compared with a proper post-shift motor-generator rotation speed (target rotation speed) found on the basis of the rotation speed of the output member, the vehicle speed, etc. Then, a feedback control of the supply current to the motor-generator is performed so that the post-shift rotation speed becomes equal to the target rotation speed. Concretely, a sensor for detecting the rotation speed of the motor-generator is disposed, and the foregoing feedback control is performed on the basis of the rotation speed information obtained via the sensor and the rotation speed of the output member. The rotation speed feedback control includes not only the foregoing control, but also a control in which the control is perfumed on the basis of the gradient of change in the rotation speed of the motor-generator (the amount of change in the rotation speed per unit time). Besides, the foregoing feedback control is used not only for the control of the supply current to the motor-generator, but also for the control of the engagement-disengagement timing of brakes (a friction engagement mechanism) provided for performing the shifting operation of the speed change mechanism.

In the construction in which an assist in drive force is provided by operation of the motor-generator as described above, the rotation speed of the motor-generator greatly changes in association with increases and decreases of the needed assist force. Therefore, in order to effectively perform the feedback control, it is necessary to detect the rotation speed of the motor-generator with high accuracy.

In order to meet this need, it is conceivable to selectively use a sensor suitable for the detection in a low rotation speed range and a sensor suitable for the detection in a high rotation speed range. For example, a construction in which a rotation speed detector called "resolver" is used for low rotation speeds and a rotation speed detector called "north marker" is used for high rotation speeds may be cited. For example, in a situation where the rotation speed of the motor-generator is less than 1000 rpm, the detected value from the "resolver" is used to perform the foregoing feedback control. On the other hand, in a situation where the rotation speed of the motor-generator is greater than or equal to 1000 rpm, the detected value from the "north marker" is used to perform the feedback control. That is, as the detected rotation speed value used for the rotation speed control of the motor-generator or the like, the detected value from the "resolver" is utilized when the rotation speed is in a low speed range, and the detected value from the "north marker" is utilized when the rotation speed is in a high speed range.

With such a construction, in a situation where the rotation speed of the motor-generator changes from the low rotation speed range to the high rotation speed range, the feedback control is switched from the feedback control based on the detected value from the "resolver" to the feedback control based on the detected value from the "north marker" during the transition. Likewise, in a situation where the rotation speed of the motor-generator changes from the high rotation speed range to the low rotation speed range, the feedback control is switched from the feedback control based on the detected value from the "north marker" to the feedback control based on the detected value from the "resolver".

The "resolver" and the "north marker" are different from each other in the principle in the detection of the rotation speed. That is, the "resolver" has a sensing construction that is suitable for the detection in a low rotation speed range, and the "north marker" has a sensing construction that is suitable for the detection in a high rotation speed range. Therefore, the detected values from the two detectors may sometimes be different from each other even when the motor-generator is operating at a fixed rotation speed.

In the case where the gear ratio shifting operation is performed while the rotation speed of the motor-generator remains within one of the low rotation speed range and the high rotation speed range, the feedback control is performed by continuing using the detected values from one of the "resolver" and the "north marker", and therefore there is no problem.

However, in the case where the rotation speed of the motor-generator changes so that the feedback control is switched from the feedback control based on the detected values from the "resolver" to the feedback control based on the detected values from the "north marker" or so that the feedback control is switched from the feedback control based on the detected values from the "north marker" to the feedback control based on the detected values from the "resolver", if the shift execution condition of the speed change mechanism is satisfied and the shifting operation is performed, the detected value of the motor-generator rotation speed fluctuates (fluctuates due to the difference between the detected values from the "resolver" and from the "north marker") during the shifting operation. Therefore, there arises a possibility that it may become impossible to perform a motor-generator rotation speed control or an engagement/release timing control of a friction engagement mechanism in an optimal manner for preventing the shift shock, and a shift shock may result.

SUMMARY OF THE INVENTION

The invention has been accomplished in view of the foregoing circumstances. The invention provides a power output device capable of appropriately performing the rotation speed control of a drive source (the motor-generator in the foregoing case), or the like, in a construction in which the rotation speed of the drive source can be detected by a plurality of kinds of rotation speed detectors (the resolver and the north marker in the foregoing case), by making proper the timing at which the rotation speed information adopted for the control is switched. The invention also provides a hybrid vehicle equipped with the power output device.

Accordingly, a solution principle of the invention is as follows. That is, with a construction capable of switching between the detected values from a plurality of kinds of rotation speed detectors (the detected value from a "resolver" and the detected value from a "north marker") as detected values of the rotation speed of a prime mover adopted as information for executing controls and the like, the switching operation is prohibited in a specific condition, so that the shift shock can be restrained.

This will be concretely described. In the invention, a power output device has a basic construction that includes a prime mover that outputs power; a speed change mechanism that is capable of switching between a plurality of speed change ratios and that gives an output of the prime mover to a drive shaft after changing the output in speed at a predetermined speed change ratio; and first and second rotation speed detectors that detect rotation speed of the prime mover. The power output device adopts information about prime mover rotation speed detected by the first rotation speed detector as present prime mover rotation speed information when the rotation speed of the prime mover is in a predetermined low rotation speed region, and adopts information about the prime mover rotation speed detected by the second rotation speed detector as the present prime mover rotation speed information when the rotation speed of the prime mover is in a predetermined high rotation speed region. Then, if the rotation speed of the prime mover changes from the low rotation speed region to the high rotation speed region, the power output device switches the prime mover rotation speed information adopted from the information about the prime mover rotation speed detected by the first rotation speed detector to the information about the prime mover rotation speed detected by the second rotation speed detector. Conversely, if the rotation speed of the prime mover changes from the high rotation speed region to the low rotation speed region, the power output device switches the prime mover rotation speed information adopted from the information about the prime mover rotation speed detected by the second rotation speed detector to the information about the prime mover rotation speed detected by the first rotation speed detector. The power output device constructed in this manner is provided with a controller as follows. That is, if a gradient of change in the prime mover rotation speed is greater than or equal to a predetermined value while the information about the prime mover rotation speed detected by one rotation speed detector of the first rotation speed detector and the second rotation speed detector is adopted as the present prime mover rotation speed information, the controller prohibits a switching operation for adopting the information about the prime mover rotation speed detected by the other rotation speed detector as the present prime mover rotation speed information, and continues to adopt the information about the prime mover rotation speed detected by the one rotation speed detector as the present prime mover rotation speed information.

In the case where the rotation speed of the prime mover changes from the low rotation speed region to the high rotation speed region, or in the case where the rotation speed of the prime mover changes from the high rotation speed region to the low rotation speed region, the related-art technology switches from the prime mover rotation speed information from the one rotation speed detector adopted as the present prime mover rotation speed information to the prime mover rotation speed information from the other rotation speed detector in association with the transition of the rotation speed region. In the invention, however, the foregoing switching operation is prohibited in the case where the gradient of change in the prime mover rotation speed adopted as the present prime mover rotation speed information is greater than or equal to a predetermined value. That is, for example, in the case where the shifting operation execution timing of the speed change mechanism and the timing of transition of the rotation region substantially coincide, execution of the switching operation may result in a sudden change of the prime mover rotation speed information during the ratio shifting operation, leading to production of a shift shock (related art). Therefore, particularly in the case where the "gradient of change in the prime mover rotation speed is greater than or equal to a predetermined value", which is a situation where the possibility of a sudden change of the prime mover rotation speed information is high, the foregoing switching operation is prohibited and the present prime mover rotation speed information continues to be adopted, so that the shift shock can be avoided. Incidentally, in this case, the switching operation is performed by recognizing the prime mover rotation speed information to be adopted according to the rotation region of the prime mover rotation speed, for example, after the shifting operation of the speed change mechanism ends. An example of the foregoing predetermined low rotation speed region is a region below 1000 rpm, and an example of the predetermined high rotation speed region is a region of the rotation speed greater than or equal to 1000 rpm. However, the low and high rotation speed regions are not limited to these regions, but can be set according to the rotation speed detection accuracies of the rotation speed detectors. Besides, the value (the foregoing predetermined value) of the gradient of change that causes the prohibition of the switching operation is set according to the construction of the power output device. For example, the value of the difference for prohibiting the switching operation is set through experiments or simulations in the design stage of the power output device.

Examples of the controls that are executed on the basis of the prime mover rotation speed information include the driving control of the prime mover and the ratio shift control of the speed change mechanism. Hereinafter, constructions in which the invention is combined with such a control operation will be described.

Firstly, a power output device in which the driving control of the prime mover is performed on the basis of the prime mover rotation speed information has a basic construction that includes a prime mover that outputs power, a speed change mechanism that is capable of switching between a plurality of speed change ratios and that gives an output of the prime mover to a drive shaft after changing the output in speed at a predetermined speed change ratio, and first and second rotation speed detectors that detect the rotation speed of the prime mover. Besides, the power output device adopts information about prime mover rotation speed detected by the first rotation speed detector as present prime mover rotation speed information and performs a driving control of the prime mover based on the present prime mover rotation speed information when the rotation speed of the prime mover is in a predetermined low rotation speed region, and that adopts information about the prime mover rotation speed detected by the second rotation speed detector as the present prime mover rotation speed information and performs the driving control of the prime mover based on the present prime mover rotation speed information when the rotation speed of the prime mover is in a predetermined high rotation speed region. Then, if the rotation speed of the prime mover changes from the low rotation speed region to the high rotation speed region, the power output device switches the prime mover rotation speed information adopted to perform the driving control of the prime mover from the information about the prime mover rotation speed detected by the first rotation speed detector to the information about the prime mover rotation speed detected by the second rotation speed detector. If the rotation speed of the prime mover changes from the high rotation speed region to the low rotation speed region, the power output device switches the prime mover rotation speed information adopted to perform the driving control of the prime mover from the information about the prime mover rotation speed detected by the second rotation speed detector to the information about the prime mover rotation speed detected by the first rotation speed detector. The power output device constructed in this manner is provided with a controller as follows. That is, if the information about the prime mover rotation speed detected by one rotation speed detector of the first rotation speed detector and the second rotation speed detector is adopted as the present prime mover rotation speed information and the driving control of the prime mover is being performed based on the present prime mover rotation speed information and a gradient of change in the prime mover rotation speed detected by the one rotation speed detector is greater than or equal to a predetermined value, the controller prohibits a switching operation for adopting the information about the prime mover rotation speed detected by the other rotation speed detector as the present prime mover rotation speed information adopted to perform the driving control of the prime mover, and continues to adopt the information about the prime mover rotation speed detected by the one rotation speed detector as the present prime mover rotation speed information and to cause the driving control of the prime mover to be performed.

Furthermore, a power output device in which the ratio shift control of a speed change mechanism is performed on the basis of the prime mover rotation speed information has a basic construction as follows. That is, the power output device includes a prime mover that outputs power, a speed change mechanism that is capable of switching between a plurality of speed change ratios and that gives an output of the prime mover to a drive shaft after changing the output in speed at a predetermined speed change ratio, and first and second rotation speed detectors that detect the rotation speed of the prime mover. The power output device adopts information about prime mover rotation speed detected by the first rotation speed detector as present prime mover rotation speed information and performs a ratio shift control of the speed change mechanism based on the present prime mover rotation speed information when the rotation speed of the prime mover is in a predetermined low rotation speed region, and adopts information about the prime mover rotation speed detected by the second rotation speed detector as the present prime mover rotation speed information and performs the ratio shift control of the speed change mechanism based on the present prime mover rotation speed information when the rotation speed of the prime mover is in a predetermined high rotation speed region. Then, if the rotation speed of the prime mover changes from the low rotation speed region to the high rotation speed region, the power output device switches the prime mover rotation speed information adopted to perform the ratio shift control of the speed change mechanism from the information about the prime mover rotation speed detected by the first rotation speed detector to the information about the prime mover rotation speed detected by the second rotation speed detector. Conversely, if the rotation speed of the prime mover changes from the high rotation speed region to the low rotation speed region, the power output device switches the prime mover rotation speed information adopted to perform the ratio shift control of the speed change mechanism from the information about the prime mover rotation speed detected by the second rotation speed detector to the information about the prime mover rotation speed detected by the first rotation speed detector. The power output device constructed in this manner is provided with a controller as follows. That is, if the information about the prime mover rotation speed detected by one rotation speed detector of the first rotation speed detector and the second rotation speed detector is adopted as the present prime mover rotation speed information and the ratio shift control of the speed change mechanism is being performed based on the present prime mover rotation speed information and a gradient of change in the prime mover rotation speed detected by the one rotation speed detector is greater than or equal to a predetermined value, the controller prohibits a switching operation for adopting the information about the prime mover rotation speed detected by the other rotation speed detector as the present prime mover rotation speed information adopted to perform the ratio shift control of the speed change mechanism, and continues to adopt the information about the prime mover rotation speed detected by the one rotation speed detector as the present prime mover rotation speed information and to cause the ratio shift control of the speed change mechanism to be performed.

The factors for occurrence of the aforementioned shift shock include a sudden change in the prime mover rotation speed during the driving control of the prime mover, an operation timing failure of a friction engagement device (e.g., a clutch or a brake that is hydraulically controlled) in the ratio shift control of the speed change mechanism, etc. Such factors arise conspicuously if the information about the prime mover rotation speed that is detected changes suddenly during a shifting operation of the speed change mechanism. Therefore, in the invention, in the case where the "gradient of change in the prime mover rotation speed is greater than or equal to a predetermined value", which is a situation where the possibility of a sudden change of the prime mover rotation speed information is high, the foregoing switching is prohibited and the present prime mover rotation speed information continues to be adopted, so that the driving control of the prime mover and the ratio shift control of the speed change mechanism can be properly performed and therefore the shift shock can be avoided.

In the foregoing constructions, the switching operation is prohibited in the case where the gradient of change in the prime mover rotation speed detected is greater than or equal to a predetermined value. Instead of this construction, there also provided constructions in which the switching operation is prohibited in the case where a difference between the prime mover rotation speed detected by one rotation speed detector and the prime mover rotation speed detected by the other rotation speed detector is greater than or equal to a predetermined value. Concrete constructions will be presented below.

Firstly, the power output device has a basic construction that includes a prime mover that outputs power, a speed change mechanism that is capable of switching between a plurality of speed change ratios and that gives an output of the prime mover to a drive shaft after changing the output in speed at a predetermined speed change ratio, and first and second rotation speed detectors that detect the rotation speed of the prime mover. The power output device adopts information about prime mover rotation speed detected by the first rotation speed detector as present prime mover rotation speed information when the rotation speed of the prime mover is in a predetermined low rotation speed region, and adopts information about the prime mover rotation speed detected by the second rotation speed detector as the present prime mover rotation speed information when the rotation speed of the prime mover is in a predetermined high rotation speed region. Then, if the rotation speed of the prime mover changes from the low rotation speed region to the high rotation speed region, the power output device switches the prime mover rotation speed information adopted from the information about the prime mover rotation speed detected by the first rotation speed detector to the information about the prime mover rotation speed detected by the second rotation speed detector. Conversely, if the rotation speed of the prime mover changes from the high rotation speed region to the low rotation speed region, the power output device switches the prime mover rotation speed information adopted from the information about the prime mover rotation speed detected by the second rotation speed detector to the information about the prime mover rotation speed detected by the first rotation speed detector. The power output device constructed in this manner is provided with a controller as follows. That is, while the information about the prime mover rotation speed detected by one rotation speed detector of the first rotation speed detector and the second rotation speed detector is adopted as the present prime mover rotation speed information, the controller compares the prime mover rotation speed detected by the one rotation speed detector and the prime mover rotation speed detected by the other rotation speed detector. If a difference between the prime mover rotation speed detected by the one rotation speed detector and the prime mover rotation speed detected by the other rotation speed detector is greater than or equal to a predetermined value, the controller prohibits a switching operation for adopting the information about the prime mover rotation speed detected by the other rotation speed detector as the present prime mover rotation speed information, and continues to adopt the information about the prime mover rotation speed detected by the one rotation speed detector as the present prime mover rotation speed information.

The difference (the foregoing predetermined value) between the foregoing two rotation speeds that causes the prohibition of the foregoing switching operation is set according to the construction of the power output device. For example, the value of the difference for prohibiting the switching operation is set through experiments or simulations in the design stage of the power output device.

As a construction obtained by combining the construction in which the driving control of the prime mover is performed on the basis of the prime mover rotation speed information and the foregoing solution means (in which the switching operation is prohibited if the difference between the prime mover rotation speed detected by one of the rotation speed detectors and the prime mover rotation speed detected by the other rotation speed detector is greater than or equal to a predetermined value), the following construction is presented.

Firstly, the power output device has a basic construction that includes a prime mover that outputs power, a speed change mechanism that is capable of switching between a plurality of speed change ratios and that gives an output of the prime mover to a drive shaft after changing the output in speed at a predetermined speed change ratio, and first and second rotation speed detectors that detect the rotation speed of the prime mover. The power output device adopts information about prime mover rotation speed detected by the first rotation speed detector as present prime mover rotation speed information and performs a driving control of the prime mover based on the present prime mover rotation speed information when the rotation speed of the prime mover is in a predetermined low rotation speed region, and adopts information about the prime mover rotation speed detected by the second rotation speed detector as the present prime mover rotation speed information and performs the driving control of the prime mover based on the present prime mover rotation speed information when the rotation speed of the prime mover is in a predetermined high rotation speed region. Then, if the rotation speed of the prime mover changes from the low rotation speed region to the high rotation speed region, the power output device switches the prime mover rotation speed information adopted to perform the driving control of the prime mover from the information about the prime mover rotation speed detected by the first rotation speed detector to the information about the prime mover rotation speed detected by the second rotation speed detector. Conversely, if the rotation speed of the prime mover changes from the high rotation speed region to the low rotation speed region, the power output device switches the prime mover rotation speed information adopted to perform the driving control of the prime mover from the information about the prime mover rotation speed detected by the second rotation speed detector to the information about the prime mover rotation speed detected by the first rotation speed detector. The power output device constructed in this manner is provided with a controller as follows. That is, while the information about the prime mover rotation speed detected by one rotation speed detector of the first rotation speed detector and the second rotation speed detector is adopted as the present prime mover rotation speed information and the driving control of the prime mover is being performed based on the present prime mover rotation speed information, the controller compares the prime mover rotation speed detected by the one rotation speed detector and the prime mover rotation speed detected by the other rotation speed detector. If a difference between the prime mover rotation speed detected by the one rotation speed detector and the prime mover rotation speed detected by the other rotation speed detector is greater than or equal to a predetermined value, the controller prohibits a switching operation for adopting the information about the prime mover rotation speed detected by the other rotation speed detector as the present prime mover rotation speed information adopted to perform the driving control of the prime mover, and continues to adopt the information about the prime mover rotation speed detected by the one rotation speed detector as the present prime mover rotation speed information and to cause the driving control of the prime mover to be performed.

A construction obtained by combining the construction in which the ratio shift control of the speed change mechanism is performed on the basis of the prime mover rotation speed information and the foregoing solution means (in which the switching operation is prohibited if the difference between the prime mover rotation speed detected by one of the rotation speed detectors and the prime mover rotation speed detected by the other rotation speed detector is greater than or equal to a predetermined value), the following construction is presented.

Firstly, the power output device has a basic construction that includes a prime mover that outputs power, a speed change mechanism that is capable of switching between a plurality of speed change ratios and that gives an output of the prime mover to a drive shaft after changing the output in speed at a predetermined speed change ratio, and first and second rotation speed detectors that detect the rotation speed of the prime mover. The power output device adopts information about prime mover rotation speed detected by the first rotation speed detector as present prime mover rotation speed information and performs a ratio shift control of the speed change mechanism based on the present prime mover rotation speed information when the rotation speed of the prime mover is in a predetermined low rotation speed region, and adopts information about the prime mover rotation speed detected by the second rotation speed detector as the present prime mover rotation speed information and performs the ratio shift control of the speed change mechanism based on the present prime mover rotation speed information when the rotation speed of the prime mover is in a predetermined high rotation speed region. Then, if the rotation speed of the prime mover changes from the low rotation speed region to the high rotation speed region, the power output device switches the prime mover rotation speed information adopted to perform the ratio shift control of the speed change mechanism from the information about the prime mover rotation speed detected by the first rotation speed detector to the information about the prime mover rotation speed detected by the second rotation speed detector. Conversely, if the rotation speed of the prime mover changes from the high rotation speed region to the low rotation speed region, the power output device switches the prime mover rotation speed information adopted to perform the ratio shift control of the speed change mechanism from the information about the prime mover rotation speed detected by the second rotation speed detector to the information about the prime mover rotation speed detected by the first rotation speed detector The power output device constructed in this manner is provided with a controller as follows. That is, while the information about the prime mover rotation speed detected by one rotation speed detector of the first rotation speed detector and the second rotation speed detector is adopted as the present prime mover rotation speed information and the ratio shift control of the speed change mechanism is being performed based on the present prime mover rotation speed information, the controller compares the prime mover rotation speed detected by the one rotation speed detector and the prime mover rotation speed detected by the other rotation speed detector. If a difference between the prime mover rotation speed detected by the one rotation speed detector and the prime mover rotation speed detected by the other rotation speed detector is greater than or equal to a predetermined value, the controller prohibits a switching operation for adopting the information about the prime mover rotation speed detected by the other rotation speed detector as the present prime mover rotation speed information adopted to perform the ratio shift control of the speed change mechanism, and continues to adopt the information about the prime mover rotation speed detected by the one rotation speed detector as the present prime mover rotation speed information and to cause the ratio shift control of the speed change mechanism to be performed.

According to these features, too, in the case where the "difference between the prime mover rotation speed detected by the one rotation speed detector and the prime mover rotation speed detected by the other rotation speed detector is greater than or equal to a predetermined value", which is a situation where the possibility of a sudden change of the prime mover rotation speed information is high, the switching operation is prohibited, and the present prime mover rotation speed information continues to be adopted, so that the shift shock can be avoided.

In the foregoing description, the switching operation is prohibited in the case where the difference between the prime mover rotation speed detected by one of the rotation speed detectors and the prime mover rotation speed detected by the other rotation speed detector is greater than or equal to a predetermined value. Instead of this construction, there is provided a construction in which the switching operation is prohibited in the case where the difference between the gradient of change in the prime mover rotation speed detected by one of the rotation speed detectors and the gradient of change in the prime mover rotation speed detected by the other rotation speed detector is greater than or equal to a predetermined value. Concrete constructions will be presented below.

Firstly, the power output device has a basic construction that includes a prime mover that outputs power, a speed change mechanism that is capable of switching between a plurality of speed change ratios and that gives an output of the prime mover to a drive shaft after changing the output in speed at a predetermined speed change ratio, and first and second rotation speed detectors that detect the rotation speed of the prime mover. The power output device adopts information about prime mover rotation speed detected by the first rotation speed detector as present prime mover rotation speed information when the rotation speed of the prime mover is in a predetermined low rotation speed region, and adopts information about the prime mover rotation speed detected by the second rotation speed detector as the present prime mover rotation speed information when the rotation speed of the prime mover is in a predetermined high rotation speed region. Then, if the rotation speed of the prime mover changes from the low rotation speed region to the high rotation speed region, the power output device switches the prime mover rotation speed information adopted from the information about the prime mover rotation speed detected by the first rotation speed detector to the information about the prime mover rotation speed detected by the second rotation speed detector. Conversely, if the rotation speed of the prime mover changes from the high rotation speed region to the low rotation speed region, the power output device switches the prime mover rotation speed information adopted from the information about the prime mover rotation speed detected by the second rotation speed detector to the information about the prime mover rotation speed detected by the first rotation speed detector. The power output device constructed in this manner is provided with a controller as follows. That is, while the information about the prime mover rotation speed detected by one rotation speed detector of the first rotation speed detector and the second rotation speed detector is adopted as the present prime mover rotation speed information, the controller compares a gradient of change in the prime mover rotation speed detected by the one rotation speed detector and the gradient of change in the prime mover rotation speed detected by the other rotation speed detector. If a difference between the gradient of change in the prime mover rotation speed detected by the one rotation speed detector and the gradient of change in the prime mover rotation speed detected by the other rotation speed detector is greater than or equal to a predetermined value, the controller prohibits a switching operation for adopting the information about the prime mover rotation speed detected by the other rotation speed detector as the present prime mover rotation speed information, and continues to adopt the information about the prime mover rotation speed detected by the one rotation speed detector as the present prime mover rotation speed information.

The difference (the foregoing predetermined value) between the gradients of change in the rotation speeds that causes the prohibition of the switching operation is set according to the construction of the power output device. For example, the value of the difference for prohibiting the switching operation is set through experiments or simulations in the design stage of the power output device.

As a construction obtained by combining the construction in which the driving control of the prime mover is performed on the basis of the prime mover rotation speed information and the foregoing solution means (in which the switching operation is prohibited if the difference between the gradient of change in the prime mover rotation speed detected by one of the rotation speed detectors and the gradient of change in the prime mover rotation speed detected by the other rotation speed detector is greater than or equal to a predetermined value), the following construction is presented.

Firstly, the power output device has a basic construction that includes a prime mover that outputs power, a speed change mechanism that is capable of switching between a plurality of speed change ratios and that gives an output of the prime mover to a drive shaft after changing the output in speed at a predetermined speed change ratio, and first and second rotation speed detectors that detect the rotation speed of the prime mover. The power output device adopts information about prime mover rotation speed detected by the first rotation speed detector as present prime mover rotation speed information and performs a driving control of the prime mover based on the present prime mover rotation speed information when the rotation speed of the prime mover is in a predetermined low rotation speed region, and adopts information about the prime mover rotation speed detected by the second rotation speed detector as the present prime mover rotation speed information and performs the driving control of the prime mover based on the present prime mover rotation speed information when the rotation speed of the prime mover is in a predetermined high rotation speed region. Then, if the rotation speed of the prime mover changes from the low rotation speed region to the high rotation speed region, the power output device switches the prime mover rotation speed information adopted to perform the driving control of the prime mover from the information about the prime mover rotation speed detected by the first rotation speed detector to the information about the prime mover rotation speed detected by the second rotation speed detector. Conversely, if the rotation speed of the prime mover changes from the high rotation speed region to the low rotation speed region, the power output device switches the prime mover rotation speed information adopted to perform the driving control of the prime mover from the information about the prime mover rotation speed detected by the second rotation speed detector to the information about the prime mover rotation speed detected by the first rotation speed detector. The power output device constructed in this manner is provided with a controller as follows. That is, while the information about the prime mover rotation speed detected by one rotation speed detector of the first rotation speed detector and the second rotation speed detector is adopted as the present prime mover rotation speed information and the driving control of the prime mover is being performed based on the present prime mover rotation speed information, the controller compares a gradient of change in the prime mover rotation speed detected by the one rotation speed detector and the gradient of change in the prime mover rotation speed detected by the other rotation speed detector. If a difference between the gradient of change in the prime mover rotation speed detected by the one rotation speed detector and the gradient of change in the prime mover rotation speed detected by the other rotation speed detector is greater than or equal to a predetermined value, the controller prohibits a switching operation for adopting the information about the prime mover rotation speed detected by the other rotation speed detector as the present prime mover rotation speed information adopted to perform the driving control of the prime mover, and continues to adopt the information about the prime mover rotation speed detected by the one rotation speed detector as the present prime mover rotation speed information and to cause the driving control of the prime mover to be performed.

As a construction obtained by combining the construction in which the ratio shift control of the speed change mechanism is performed on the basis of the prime mover rotation speed information and the foregoing solution means (in which the switching operation is prohibited if the difference between the gradient of change in the prime mover rotation speed detected by one of the rotation speed detectors and the gradient of change in the prime mover rotation speed detected by the other rotation speed detector is greater than or equal to a predetermined value), the following construction is presented.

Firstly, the power output device has a basic construction that includes a prime mover that outputs power, a speed change mechanism that is capable of switching between a plurality of speed change ratios and that gives an output of the prime mover to a drive shaft after changing the output in speed at a predetermined speed change ratio, and first and second rotation speed detectors that detect the rotation speed of the prime mover. The power output device adopts information about prime mover rotation speed detected by the first rotation speed detector as present prime mover rotation speed information and performs a ratio shift control of the speed change mechanism based on the present prime mover rotation speed information when the rotation speed of the prime mover is in a predetermined low rotation speed region, and adopts information about the prime mover rotation speed detected by the second rotation speed detector as the present prime mover rotation speed information and performs the ratio shift control of the speed change mechanism based on the present prime mover rotation speed information when the rotation speed of the prime mover is in a predetermined high rotation speed region. Then, if the rotation speed of the prime mover changes from the low rotation speed region to the high rotation speed region, the power output device switches the prime mover rotation speed information adopted to perform the ratio shift control of the speed change mechanism from the information about the prime mover rotation speed detected by the first rotation speed detector to the information about the prime mover rotation speed detected by the second rotation speed detector. Conversely, if the rotation speed of the prime mover changes from the high rotation speed region to the low rotation speed region, the power output device switches the prime mover rotation speed information adopted to perform the ratio shift control of the speed change mechanism from the information about the prime mover rotation speed detected by the second rotation speed detector to the information about the prime mover rotation speed detected by the first rotation speed detector. The power output device constructed in this manner is provided with a controller as follows. That is, while the information about the prime mover rotation speed detected by one rotation speed detector of the first rotation speed detector and the second rotation speed detector is adopted as the present prime mover rotation speed information and the ratio shift control of the speed change mechanism is being performed based on the present prime mover rotation speed information, the controller compares a gradient of change in the prime mover rotation speed detected by the one rotation speed detector and the gradient of change in the prime mover rotation speed detected by the other rotation speed detector. If a difference between the gradient of change in the prime mover rotation speed detected by the one rotation speed detector and the gradient of change in the prime mover rotation speed detected by the other rotation speed detector is greater than or equal to a predetermined value, the controller prohibits a switching operation for adopting the information about the prime mover rotation speed detected by the other rotation speed detector as the present prime mover rotation speed information adopted to perform the ratio shift control of the speed change mechanism, and continues to adopt the information about the prime mover rotation speed detected by the one rotation speed detector as the present prime mover rotation speed information and to cause the ratio shift control of the speed change mechanism to be performed.

According to these features, too, in the case where the "difference between the gradient of change in the prime mover rotation speed detected by the one rotation speed detector and the gradient of change in the prime mover rotation speed detected by the other rotation speed detector is greater than or equal to a predetermined value", which is a situation where the possibility of a sudden change of the prime mover rotation speed information is high, the switching operation is prohibited, and the present prime mover rotation speed information continues to be adopted, so that the shift shock can be avoided.

Even in a situation where the gradient of change in the prime mover rotation speed adopted as the present prime mover rotation speed information is large, the switching operation is permitted if the gradient of change in the prime mover rotation speed following the operation of switching the adopted information (the gradient of change in the prime mover rotation speed detected by the other rotation speed detector) is substantially as large as (is close to) the gradient of change in the prime mover rotation speed adopted as the present prime mover rotation speed information. Therefore, it is possible to restrain the occurrence of a situation in which the foregoing switching operation is frequently prohibited.

In a more concrete construction for the foregoing construction, the prime mover is a motor-generator, and the first rotation speed detector is a resolver. Besides, the second rotation speed detector may be a north marker that calculates the rotation speed on the basis of pulse waves from an electromagnetic pickup that detects a protrusion provided on the rotating body.

Specifically, as a common construction, the resolver has, for example, an exciting coil that rotates (that rotates integrally with a rotation shaft of the prime mover), and two pairs of detection coils that are fixed. The resolver obtains the rotation angle on the basis of two phase signals different from each other by 90° whose amplitude changes in a sine wave fashion against the rotation angle of the exciting coil, and therefore detects the rotation speed of the motor-generator. This detection system is particularly suitable to detect low rotation speeds. Incidentally, the construction of the resolver is not limited to this system.

On the other hand, the north marker detects the protrusion provided on the rotor of the motor-generator or a shaft member that is rotatable integrally with the rotor, and then calculates the rotation speed on the basis of the pulse waves generated at the time of the detection of the protrusion. This detection system is particularly suitable to detect high rotation speeds. The construction of the north marker is not limited to this system.

Thus, since the resolver and the north marker differ from each other in the principle in the detection of the rotation speed (differ in the transitional characteristic), a large shift shock may result if the foregoing switching operation is executed in the case where the shifting operation execution timing of the speed change mechanism and the execution-requiring timing for the switching operation (the operation of switching from the detected value from the resolver to the detected value from the north marker, or the operation of switching from the detected value from the north marker to the detected value from the resolver) substantially coincide with each other. Thus, according to the construction of the invention, while the highly accurate rotation speed detection operation suitable to rotation speeds is made possible by using the resolver and the north marker, the shift shock can be avoided by making proper the switching operation.

Furthermore, hybrid vehicles equipped with the foregoing power output device are also within the technical idea of the invention. That is, such a hybrid vehicle in the invention includes an internal combustion engine that gives a drive force to the drive shaft, and a construction in which an assist is provided for vehicle-running drive force by giving the power of the prime mover to the drive shaft via the speed change mechanism.

In the invention, in a construction in which the switching operation of selectively using values detected by a plurality of rotation speed detectors as the detected value of the prime mover rotation speed adopted as the information for executing controls and the like can be performed, the switching operation is prohibited in a specific condition. That is, the invention makes it possible to avoid a situation in which the prime mover rotation speed information suddenly changes during a ratio shifting operation. Therefore, the shift shock can be restrained, and good driveability can be realized in the case the power output device is mounted in a vehicle.

BRIEF DESCRIPTION OF THE DRAWINGS

The foregoing and further features, advantages of the invention will be better understood by reading the following detailed description of preferred embodiments of the invention, when considered in connection with the accompanying drawings, in which.

DETAILED DESCRIPTION OF THE EMBODIMENTS

In the following description and the accompanying drawings, the present invention will be described in greater detail with reference to example embodiments.

Hereinafter, embodiments of the invention will be described with reference to the drawings. In the following embodiments, the invention is applied as a power output device of a hybrid vehicle equipped with two motor-generators. The description will be made in conjunction with the case where the invention is applied to an FR (front engine, rear wheel drive) vehicle.

First Embodiment

Overall Construction of Hybrid System

Figure 1:
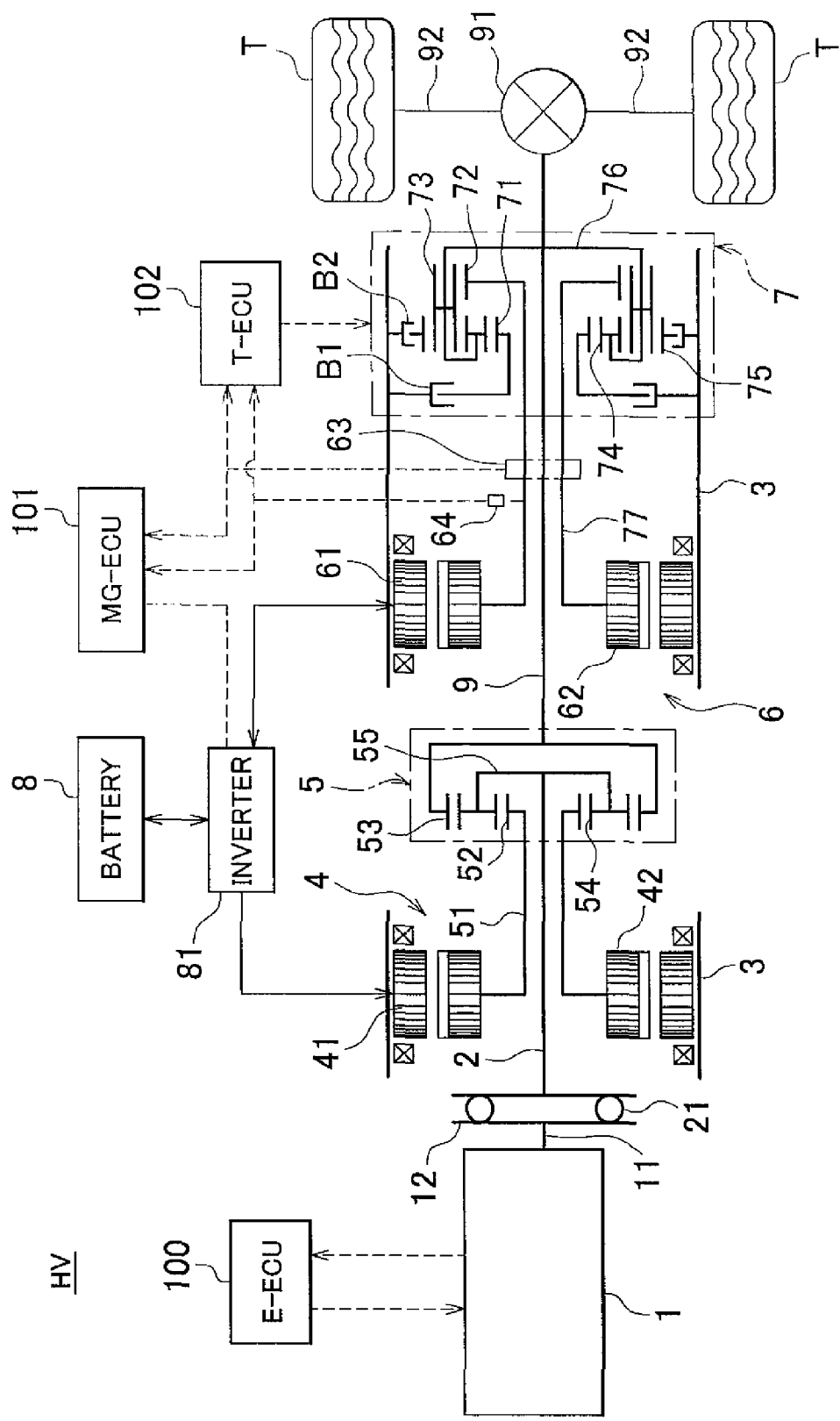
FIG. 1 is a diagram showing a general construction of a hybrid system mounted in a hybrid vehicle in accordance with an embodiment of the invention.
Figure 2:
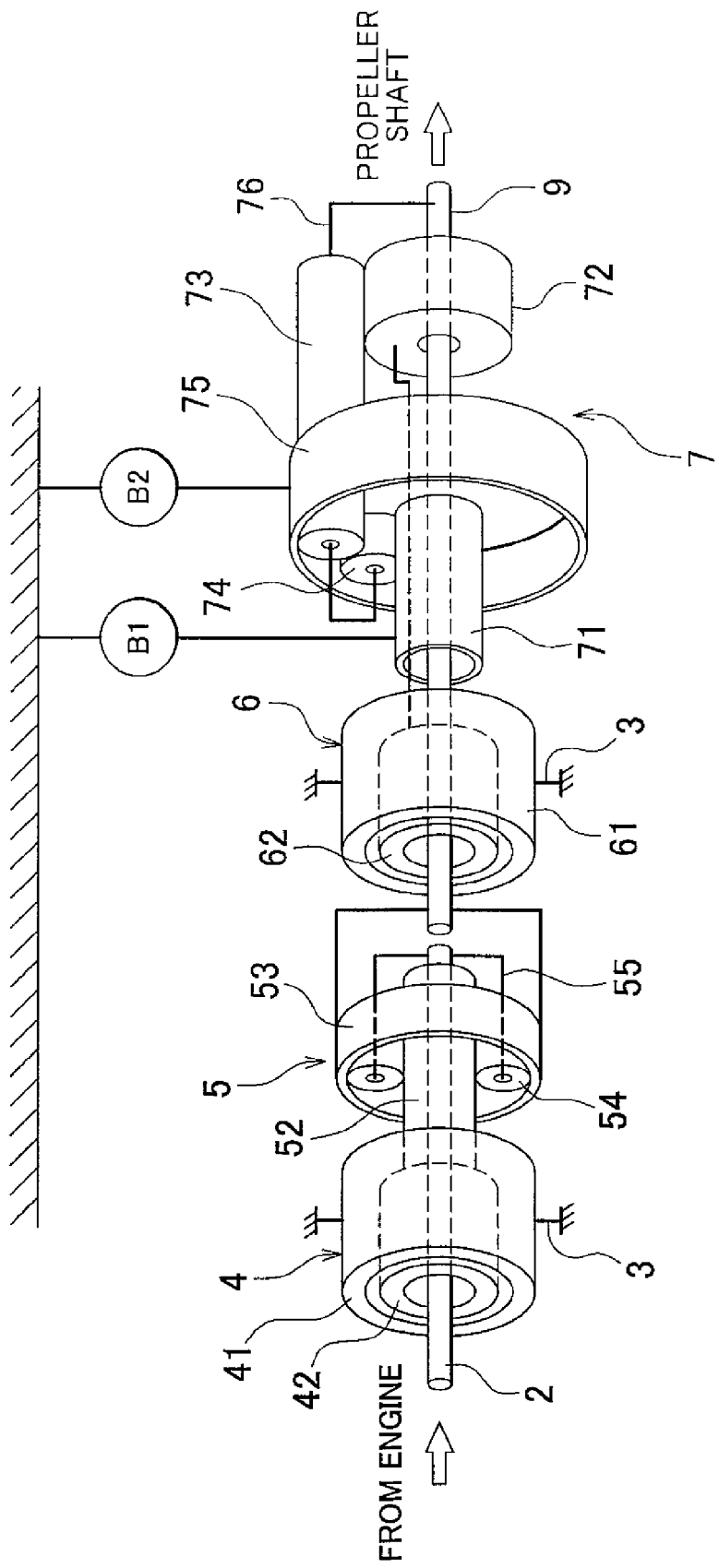
FIG. 2 is a diagram schematically showing a gear train of the hybrid system.

FIG. 1 is a diagram showing a general construction of a hybrid system mounted in a hybrid vehicle in accordance with of an embodiment. A vehicle HV shown in FIG. 1 is an FR type hybrid vehicle (hereinafter, simply referred to as "vehicle"). In FIG. 1, the vehicle HV is provided with an engine (internal combustion engine) 1 as a main drive force source. The engine 1 is a well known power device that burns a mixture of fuel and air in a cylinder, and converts thermal energy into rotational kinetic energy, and thus outputs the energy. FIG. 2 is a diagram schematically showing a gear train of the hybrid system.

Concretely, as the engine 1, it is possible to apply a gasoline engine, a diesel engine, an LPG engine, etc. The engine 1 is constructed so that the operation state thereof can be controlled via the degree of throttle opening (intake air amount), the amount of fuel injection, the ignition timing, etc. Besides, the control thereof is performed by an electronic control device (E-ECU) 100 that is made up mainly of a microcomputer.

A crankshaft 11, which is an output shaft of the engine 1, is rotatable about a rotation axis extending in the front-rear direction of the vehicle HV. Besides, a flywheel 12 is disposed on a rear end of the crankshaft 11. An input shaft 2 is linked to the flywheel 12 via a damper mechanism 21.

Within a casing 3 that contains the hybrid system, various devices and the like are disposed. That is, a first motor-generator (MG1) 4 that functions mainly as an electric generator, a power distribution mechanism 5, a second motor-generator (MG2, a prime mover in the invention) 6, and a two-step speed change-type reduction mechanism Each of the motor-generators 4, 6 used herein is a synchronous electric motor that has both a power running function of converting electric energy into kinetic energy and a regenerative function of converting kinetic energy into electric energy. More concretely, the first motor-generator 4 generates electric power to be supplied to the second motor-generator 6 while receiving drive force from the engine 1 via the power distribution mechanism 5, and also functions as a drive force generation source when the vehicle is to be started. On the other hand, the second motor-generator 6 functions to assist in producing the vehicle-running drive force and to generate electric power through a regenerative operation during braking or deceleration. The motor-generators 4, 6 have stators 41, 61 and rotors 42, 62, respectively. The stators 41, 61 are fixed to an internal wall of the casing 3. Besides, the motor-generators 4, 6 are connected via an inverter 81 to an electricity storage device 8 capable of receiving and sending out electric power. As the electricity storage device 8, concretely, it is possible to use a battery (a nickel hydride battery, etc.), a capacitor, etc. Besides, the motor-generators 4, 6 are constructed so that the power running and the regeneration, and the torques during the power running and the regeneration are controlled through the control of the inverter 81 by an electronic control device (MG-ECU) 101 that is made mainly of a microcomputer.

The power distribution mechanism 5 is constructed of a single pinion-type planetary gear mechanism. That is, the power distribution mechanism 5 includes a sun gear 52 formed on a hollow shaft 51, a ring gear 53 disposed concentrically with the sun gear 52, and a carrier 55 holding a plurality of pinions 54 meshing with the sun gear 52 and the ring gear 53. The input shaft 2 and the carrier 55 are linked so as to rotate together. The input shaft 2 is disposed within the hollow shaft 51. The input shaft 2 and the hollow shaft 51 are rotatable relative to each other.

The crankshaft 11, the flywheel 12, the input shaft 2 and the power distribution mechanism 5 are disposed coaxially. Besides, in the front-rear direction of the vehicle HV (the direction of the axis of the crankshaft 11), the first motor-generator 4 is disposed between the power distribution mechanism 5 and the combination of the flywheel 12 and the damper mechanism 21. The input shaft 2 is disposed so as to extend through an internal space of the rotor 42 of the first motor-generator 4. Since the carrier 55 is linked to a rear end of the input shaft 2, the carrier 55 serves as an input element in the power distribution mechanism 5. Besides, since the rotor 42 of the first motor-generator 4 is linked via the hollow shaft 51 to the sun gear 52 so that they rotate together, the sun gear 52 serves as a so-called reaction element. Furthermore, the ring gear 53 is linked to an output shaft (drive shaft) 9 (described below) so that they rotate together.

The reduction mechanism 7 is constructed of a Ravigneaux type planetary gear mechanism. That is, the reduction mechanism 7 has a construction that includes a front sun gear 71, a rear sun gear 72 larger in diameter than the front sun gear 71, long pinions 73, short pinions 74, a ring gear 75, and a carrier 76 that holds the long pinions 73 and the short pinions 74 so that they are rotatable about their own axis.

The front sun gear 71 is linked to a first brake B1 that permits or restricts the rotation of the front sun gear 71. The first brake B1 used herein is a hydraulically controlled friction engagement device.

The rear sun gear 72 is linked via a hollow shaft 77 to a rotor 62 of the second motor-generator 6 so that they rotate together.

The long pinions 73 are in mesh with the front sun gear 71 via the short pinions 74. That is, the short pinions 74 are in mesh with the long pinions 73 and also with the front sun gear 71. Besides, the long pinions 73 are also in mesh with the rear sun gear 72 and the ring gear 75.

While an inner peripheral side of the ring gear 75 is in mesh with the long pinions 73, the ring gear 75 is linked to a second brake B2 that permits or restricts the rotation of the ring gear 75. The second brake B2 used herein is a hydraulically controlled friction engagement device.

The carrier 76 is linked to the output shaft 9 so that they rotate together. The output shaft 9 is disposed coaxially with the input shaft 2. Besides, a front end of the output shaft 9 is linked to the ring gear 53 of the power distribution mechanism 5 so that they rotate together. The hollow shaft 77 is disposed outside the output shaft 9, and the output shaft 9 and the hollow shaft 77 are rotatable relative to each other. The hollow shaft 77 and the rotor 62 of the second motor-generator 6 are linked so that they rotate together.

Therefore, in the reduction mechanism 7, the rear sun gear 72 is a so-called input element, and the carrier 76 is an output element. Besides, by engaging the first brake B1, a high-speed step whose speed change ratio is greater than "1" is set. By engaging the second brake B2 instead of the first brake B1, a low-speed step whose speed change ratio is greater than that of the high-speed step. The shifting between these speed change steps is executed on the basis of the vehicle run state, such as the vehicle speed, the required drive force (or the accelerator operation amount), etc. More concretely, speed change step regions are determined beforehand in the form of a map (shift chart), and a control is performed so as to set either one of the speed change steps according to the state of operation detected. An electronic control device (T-ECU) 102 made mainly of a microcomputer for performing the control is provided.

The output shaft 9 and a differential 91 are linked via a propeller shaft (not shown). The differential 91 is linked to drive shafts 92, 92, via a differential mechanism that is contained in the differential 91. Wheels T, T are attached to the drive shafts 92, 92.

Operations of the mechanisms 5, 7 will be described below. As for the operation of the power distribution mechanism 5, when the reaction torque from the first motor-generator 4 with respect to the output torque of the engine 1 input to the carrier 55 is input to the sun gear 52, the ring gear 53, which is serving as an output element, obtains, as an output, a torque that is greater than the torque input from the engine 1. In that case, the first motor-generator 4 functions as an electric generator. Besides, in the case where the rotation speed (output rotation speed) of the ring gear 53 is made constant, the rotation speed of the engine 1 can be continuously (steplessly) changed by increasing or decreasing the rotation speed of the first motor-generator 4. That is, a control of setting the rotation speed of the engine 1 at, for example, a rotation speed that achieves the best fuel economy, can be performed by controlling the first motor-generator 4.

Furthermore, as for the operation of the reduction mechanism 7, if the ring gear 75 is fixed by the second brake B2, the low speed step L is set, so that the torque output by the second motor-generator 6 is amplified according to the speed change ratio, and then is applied to the output shaft 9. If the front sun gear 71 is fixed by the first brake B1, the high speed step H, whose speed change ratio is smaller than that of the low speed step L, is set. Since the speed change ratio of the high speed step H is also greater than "1", the torque output by the second motor-generator 6 is amplified according to the speed change ratio, and then is applied to the output shaft 9.

Incidentally, during a state where either one of the speed change steps L, H is steadily set, the torque applied to the output shaft 9 becomes equal to the torque obtained by increasing the output torque of the second motor-generator 6 according to the speed change ratio. During a shift transition state, however, the torque applied to the output shaft 9 becomes equal to a torque that has been affected by the torque capacities of the brakes B1, B2 and the inertia torque involved in changes in rotation speed, etc. Besides, the torque applied to the output shaft 9 becomes positive torque when the second motor-generator 6 is driving, and becomes negative torque when the second motor-generator 6 is being driven.

A main object of the above-described hybrid system is to operate the engine 1 in a state of a highest-possible efficiency so as to reduce the amount of exhaust gas and better the fuel economy and also to perform energy regeneration so as to also better the fuel economy. Therefore, in the case where a large drive force is required, the second motor-generator 6 is driven to apply its torque to the output shaft 9 while the torque of the engine 1 is being transmitted to the output shaft 9. In that case, during a low vehicle speed state, the reduction mechanism 7 is set to the low speed step L to increase the torque applied to the output shaft 9. Then, if the vehicle speed increases, the reduction mechanism 7 is set to the high speed step H to decrease the rotation speed of the second motor-generator 6. This is performed to maintain a good driving efficiency of the second motor-generator 6 so as to prevent deterioration of the fuel economy.

Therefore, in this hybrid system, the shifting operation via the reduction mechanism 7 is sometimes executed during a vehicle run during which the second motor-generator 6 is being operated. That shifting operation is executed by changing the engagement/release states of the brakes B1, B2. For example, to make a switch from the low speed step L to the high speed step H, the second brake B2 is released from the engaged state, and simultaneously the first brake B1, having been in the released state, is engaged. To make a switch from the high speed step H to the low speed step L, the first brake B1 is released from the engaged state, and simultaneously the second brake B2, having been in the released state, is engaged.

—MODE SWITCHING—The concrete modes of the hybrid system in accordance with this embodiment include an engine travel mode, an electric motor vehicle (EV) mode, and a hybrid mode. The mode can be switched among these modes.

In the case where the engine travel mode is selected, fuel is supplied to the engine 1 so that the engine 1 autonomously operates, while the supply of electric power to the second motor-generator 6 is stopped. In the case where the engine 1 is autonomously operating, the engine torque is transmitted to the output shaft 9 via the input shaft 2, the carrier 55, and the ring gear 53. The torque of the output shaft 9 is transmitted to the wheels T, T via the propeller shaft, the differential 91 and the drive shafts 92, 92, so that vehicle drive force is generated.

On another hand, in the case where the electric motor vehicle mode is selected, the second motor-generator 6 is started as an electric motor and the torque of the second motor-generator 6 is transmitted to the wheels T, T via the reduction mechanism 7, the output shaft 9, the differential 91, and the drive shafts 92, 92, while the engine 1 is not supplied with fuel.

Furthermore, in the case where the hybrid mode is selected, the engine 1 autonomously operates, and electric power is supplied to the second motor-generator 6, so that the torque of the engine 1 and the torque of the second motor-generator 6 are both transmitted to the wheels T, T.

Thus, the vehicle HV is a mechanical distribution type hybrid vehicle capable of mechanically distributing engine torque to the wheels T, T and the first motor-generator 4 via the power distribution mechanism 5 and also capable of selecting at least one of the engine 1 and the second motor-generator 6 as a drive force source. Furthermore, in the case where engine torque is transmitted to the power distribution mechanism 5, a portion of the engine torque is transmitted to the first motor-generator 4, and the first motor-generator 4 is caused to function as a reaction element by the differential function realized by the sun gear 52, the carrier 55 and the ring gear 53 of the power distribution mechanism 5. Therefore, the engine rotation speed can be steplessly (continuously) controlled by controlling the rotation speed of the first motor-generator 4. That is, the power distribution mechanism 5 also has the function as a continuously variable transmission.

In the case where the electric motor vehicle mode or the hybrid mode is selected, two kinds of shift modes as described above are available in order to control the reduction mechanism 7, that is, the speed change ratio of the reduction mechanism 7 is controlled on the basis of one of the two shift modes. An appropriate shift mode is determined on the basis of the vehicle speed, the required drive force, etc. In this manner, one of the low speed mode and the high speed mode can be selected. The required drive force is determined on the basis of, for example, a signal from an accelerator operation amount sensor, or the like. For example, if the vehicle speed is less than or equal to a predetermined vehicle speed and the accelerator operation amount is greater than or equal to a predetermined value, the low speed mode is selected. On another hand, if the vehicle speed is above the predetermined vehicle speed and the accelerator operation amount is less than the predetermined value, the high speed mode is selected.

In the case where the low speed mode is selected, the first brake B1 is released and the second brake B2 is engaged. In this case where the low speed mode is selected and the torque of the second motor-generator 6 is transmitted to the rear sun gear 72, the ring gear 75 becomes a reaction element, and the torque of the rear sun gear 72 is transmitted to the wheels T, T via the carrier 76, the output shaft 9, and the differential 91. Incidentally, the rotation speed of the output shaft 9 is lower than the rotation speed of the second motor-generator 6. In addition, in the case where the low speed mode is selected, the speed change ratio of the reduction mechanism 7 is "LOW (the maximum speed change ratio)".

On the other hand, in the case where the high speed mode is selected, the second brake B2 is released and the first brake B1 is engaged. Besides, the second motor-generator 6 is driven as an electric motor, and the front sun gear 71 becomes a reaction element, and the torque of the rear sun gear 72 is transmitted to the wheels T, T via the carrier 76, the output shaft 9, and the differential 91. Incidentally, the rotation speed of the output shaft 9 is lower than the rotation speed of the second motor-generator 6. In the case where the high speed mode is selected, the speed change ratio of the reduction mechanism 7 is "HIGH (a small speed change ratio)", and is smaller than the speed change ratio of the reduction mechanism 7 set in the case where the low speed mode is selected.

In the case where the vehicle HV coasts, it is possible to transmit the kinetic energy of the vehicle HV from the wheels T, T to the second motor-generator 6 and, at the same time, charge the electricity storage device 8 with the electric power generated by the second motor-generator 6.

Meanwhile, in the case where a condition for starting (cranking) the engine 1 is satisfied while the supply of fuel to the engine 1 has been stopped, electric power is supplied to the first motor-generator 4 to drive the first motor-generator 4 as an electric motor, and the torque of the first motor-generator 4 is transmitted to the engine 1 via the power distribution mechanism 5 and the input shaft 2 to increase the engine rotation speed. Also, fuel is supplied and is combusted. When the engine rotation speed reaches a rotation speed that allows autonomous rotation, the cranking through the use of the first motor-generator 4 is ended.

During the backward travel (reverse) of the vehicle, the second motor-generator 6 is reversely rotated to provide drive force.

The torque control of the second motor-generator 6 and the engagement/release timing control of the brakes B1, B2 as described above are executed by a feedback control based on the rotation speed of the second motor-generator 6. For example, the present rotation speed of the second motor-generator 6 and a target rotation speed that is a proper post-shift rotation speed of the second motor-generator 6 found on the basis of the rotation speed of the output shaft 9 or the like are compared, and the feedback control of the electric current supplied to the second motor-generator 6 is performed so that the post-shift rotation speed becomes equal to the target rotation speed. Besides, the feedback control of the engagement/release timing of the brakes B1, B2 is also performed so that the engaging and releasing operations of the brakes B1, B2 are performed at a timing at which the rotation speed of the second motor-generator 6 becomes synchronous with the rotation speed of the output shaft 9.

In order to effectively perform the feedback control as described above, it is necessary to detect the rotation speed of the second motor-generator 6 with high accuracy. Therefore, in the hybrid system in accordance with the embodiment, two rotation speed detectors are selectively used according to the rotation speed of the second motor-generator 6. Concretely, a detector called a resolver 63 is used for low rotation speeds, and a detector called a north marker 64 is used for high rotation speeds. These detectors will be described below.

—RESOLVER 63 AND NORTH MARKER 64—The resolver 63 and the north marker 64 are disposed so as to detect the rotation speed of the hollow shaft 77 that is linked to the rotor 62 of the second motor-generator 6 so that they rotate together, and detection signals from the two detectors (rotation speed information) are input to an MG-ECU 101 and a T-ECU 102. Concrete descriptions thereof will be given below.

The resolver 63 is the same in construction as common resolvers, that is, the resolver 63 has a construction that includes a resolver stator (not shown), a resolver rotor that is disposed inwardly of the resolver stator and that is provided on the hollow shaft 77 so that they rotation together, and a rotary transformer. The rotation of the resolver rotor associated with rotation of the hollow shaft 77 causes a rotation angle signal to be electrically output via the rotary transformer, and the rotation speed of the hollow shaft 77 is detected on the basis of the signal. This rotation speed detection method is particularly suitable to detect low rotation speeds.

On the other hand, the north marker 64 has a construction in which projections provided on an outer peripheral surface of the hollow shaft 77 (e.g., projections provided at two sites) are detected by an electromagnetic pickup, and the rotation speed is calculated on the basis of pulse waves that are generated at the time of detection. This method is particularly suitable to detect high rotation speeds.

Thus, the resolver 63 and the north marker 64 are different from each other in the rotation speeds that can be detected at high accuracy. Therefore, in a situation where the rotation speed of the second motor-generator 6 is relatively low, the controls by the MG-ECU 101 and the T-ECU 102 (the feedback control of the electric current supplied to the second motor-generator 6, and the feedback control of the engagement/release timing of the brakes B1, B2) are performed by using the detection signal resulting from the detection by the resolver 63. On the other hand, in a situation where the rotation speed of the second motor-generator 6 is relatively high, the aforementioned controls by the MG-ECU 101 and the T-ECU 102 are performed by using the detection signals resulting from the detection by the north marker 64.

Thus, since the resolver 63 and the north marker 64 are different from each other in the principle in the detection of the rotation speed, their detected rotation speed values may differ from each other even when the second motor-generator 6 is operating at a certain rotation speed. Then, if the condition for executing the shifting operation of the reduction mechanism 7 is satisfied and the shifting operation is performed in the case where the rotation speed of the second motor-generator 6 changes so that the control is switched from the feedback control based on the detected value from the resolver 63 to the feedback control based on the detected value from the north marker 64 or in the case where the control is switched form the feedback control based on the detected value from the north marker 64 to the feedback control based on the detected value from the resolver 63, the detected value of the rotation speed of the second motor-generator 6 fluctuates (due to a difference between the detected values from the resolver 63 and from the north marker 64), thus giving rise to a possibility of causing a shift shock.

In this embodiment, to avoid such a situation, the foregoing switching operation is prohibited in the case where the gradient of change in the rotation speed that is adopted as the present rotation speed information about the second motor-generator 6 is greater than or equal to a predetermined value. That is, in the case where "the gradient of change in the rotation speed of the second motor-generator 6 is greater than or equal to a predetermined value", which is the case where there is high possibility of a sudden change of the rotation speed information about the second motor-generator 6, the foregoing switching operation is prohibited, and the present rotation speed information continues to be adopted, so that the shift shock can be avoided. That is, in the case where the rotation speed of the second motor-generator 6 detected by the resolver 63 is adopted to perform the foregoing controls, the detected rotation speed information from the resolver 63 continues to be used to perform the controls. Conversely, in the case where the rotation speed of the second motor-generator 6 detected by the north marker 64 is adopted to perform the foregoing controls, the detected rotation speed information from the north marker 64 continues to be used to perform the controls.

Figure 3:
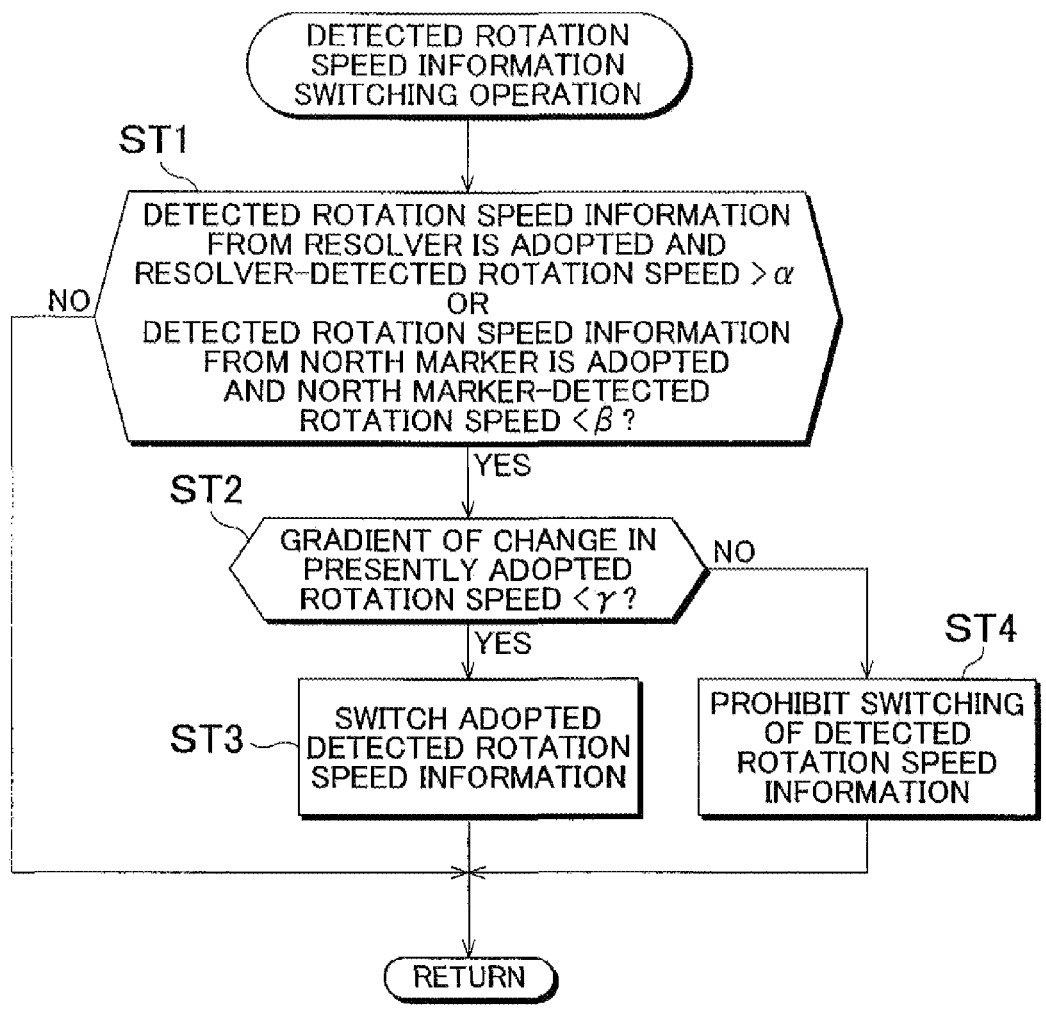
FIG. 3 is a diagram showing a control procedure of an operation of switching detected rotation speed information in a first embodiment.

—OPERATION OF SWITCHING DETECTED ROTATION SPEED INFORMATION—Next, a control procedure of the operation of switching the detected rotation speed information in which if the gradient of change in the rotation speed adopted as the present rotation speed information about the second motor-generator 6 is greater than or equal to a predetermined value, the foregoing switching operation is prohibited will be described with reference to FIG. 3. The routine shown in FIG. 3 is executed at every predetermined time, for example, every several milliseconds, after the engine is started.

During the running state of the vehicle, firstly in step ST1, it is determined whether or not it is presently a timing of switching "from a situation where the detected rotation speed information from the resolver 63 is adopted to a situation where the detected rotation speed information from the north marker 64 is adopted" as rotation speed information about the second motor-generator 6 which is adopted for performing the controls or it is presently a timing of switching "from the situation where the detected rotation speed information from the north marker 64 is adopted to the situation where the detected rotation speed information from the resolver 63 is adopted" as rotation speed information about the second motor-generator 6 which is adopted for performing the controls. Concretely, it is determined whether or not one of the following conditions is satisfied.

(1) Whether or not the detected rotation speed information from the resolver 63 has presently been adopted and the rotation speed of the second motor-generator 6 based on the detected rotation speed information from the resolver 63 is greater than or equal to a predetermined value $\alpha$ (e.g., 1100 rpm); and (2) whether or not the detected rotation speed information from the north marker 64 has presently been adopted and the rotation speed of the second motor-generator 6 based on the detected rotation speed information from the north marker 64 is less than a predetermined value $\beta$ (e.g., 900 rpm). That is, the foregoing condition (1) is for determining that the timing at which the detected rotation speed information from the north marker 64 is to be adopted has come as the rotation speed of the second motor-generator 6 has risen from a relatively low rotation speed to above the predetermined value $\alpha$.

On the other hand, the condition (2) is for determining that the timing at which the detected rotation speed information from the resolver 63 is to be adopted has come as the rotation speed of the second motor-generator 6 has declined from a relatively high rotation speed to below the predetermined value $\beta$.

A reason for setting $\alpha$ and $\beta$ at values different from each other as described above is to prevent frequent switching between the state in which the rotation speed information from the resolver 63 is adopted as the detected rotation speed information to be adopted for the foregoing control and the state in which the rotation speed information from the north marker 64 is adopted as the detected rotation speed information.

If neither one of the conditions (1) and (2) is satisfied, this routine is ended.

On the other hand, if one of the conditions (1) and (2) is satisfied, that is, if the answer to the determination in step ST1 is YES, the process proceeds to step ST2, in which it is determined whether or not the gradient of change in the rotation speed adopted as the present rotation speed information about the second motor-generator 6 is less than a predetermined value $\gamma$ (e.g., the amount of change in the rotation speed per 10 msec is less than 10 rpm).

If it is determined the gradient of change in the rotation speed is less than the predetermined value $\gamma$, that is, if the answer to the determination in step ST2 is YES, the aforementioned switching operation is not prohibited, but the operation of switching the detected rotation speed information that is adopted as the rotation speed information about the second motor-generator 6 is performed. That is, in the case where the satisfaction of the condition (1) has been determined, the control is switched to a control operation in which the detected rotation speed information from the north marker 64 is adopted. On the other hand, in the case where the satisfaction of the condition (2) has been determined, the control is switched to a control operation in which the detected rotation speed information from the resolver 63 is adopted.

If it is determined in step ST 2 that the gradient of change in the rotation speed is greater than or equal to the predetermined value γ, that is, if the answer to the determination in step ST2 is NO, the process proceeds to step ST4, in which the foregoing switching operation is prohibited. That is, in the case where the satisfaction of the condition (1) has been determined, the control operation in which the detected rotation speed information from the resolver 63 is adopted is continued despite the satisfaction of the condition (1). On the other hand, in the case where the satisfaction of the condition (2) has been determined, the control operation in which the detected rotation speed information from the north marker 64 is adopted is continued despite the satisfaction of the condition (2).

Thus, in the embodiment, in the case where the gradient of change in the rotation speed adopted as the present rotation speed information about the second motor-generator 6 is greater than or equal to the predetermined value, the switching operation is prohibited and the present rotation speed information continues to be adopted. Therefore, a sudden change of the rotation speed information about the second motor-generator 6 can be avoided. The switching operation is not performed even if the shifting operation execution timing of the reduction mechanism 7 and the rotation region transition timing (the timing of the "YES" determination in step ST1) substantially coincide with each other. Thus, it does not happen that the rotation speed information about the second motor-generator 6 suddenly changes during the shifting operation. Therefore, a shift shock can be avoided, and good driveability can be obtained.

Second Embodiment

Next, a second embodiment of the invention will be described. The second embodiment is different from the first embodiment in the procedure for determining whether or not to prohibit the switching operation. Besides, the hybrid system in accordance with this embodiment has a plurality of kinds of feedback controls (the feedback control of the electric current supplied to the second motor-generator 6, and the feedback control of the engagement/release timing of the brakes B1, B2), and it is possible to switch among the feedback controls according to the running situation of the vehicle, and the like. The other constructions and operations of the hybrid system are the same as in the first embodiment, and therefore, only the feedback control operation and the operation of switching the detected rotation speed information will be described.

In the hybrid system in accordance with this embodiment, the number of the kinds of the feedback controls available is three, and the switching among them is possible. Hereinafter, the three kinds of the feedback controls will be individually described.

(A) A first one of the feedback controls is based on the rotation speed of the second motor-generator 6 as in the first embodiment. That is, the present rotation speed of the second motor-generator 6 and a proper post-shift rotation speed (target rotation speed) of the second motor-generator 6 found on the basis of the rotation speed of the output shaft 9 or the like are compared, and the feedback control of the electric current supplied to the second motor-generator 6 is performed so that the post-shift rotation speed becomes equal to the target rotation speed. Besides, the feedback control of the engagement/release timing of the brakes B1, B2 is also performed so that the engaging and releasing operations of the brakes B1, B2 are performed at a timing at which the rotation speed of the second motor-generator 6 becomes synchronous with the rotation speed of the output shaft 9.

(B) A second feedback control is based on the gradient of change in the rotation speed of the second motor-generator 6. That is, the amount of change in the rotation speed of the second motor-generator 6 per unit time is calculated, and this is used as the gradient of change in the rotation speed of the second motor-generator 6 to perform the feedback control. That is, in a situation where the gradient of change in the rotation speed sharply changes, the feedback control of the electric current supplied to the second motor-generator 6 is performed so as to restrain the gradient of change within a predetermined range. Besides, the feedback control of the engagement/release timing of the brakes B1, B2 is performed so that the engaging and releasing operations of the brakes B1, B2 are performed at a timing at which the rotation speed of the second motor-generator 6 becomes synchronous with the rotation speed of the output shaft 9.

(C) The third feedback control is a combination of the first feedback control and the second feedback control. That is, the feedback control of the supply current to the second motor-generator 6 is executed by the first feedback control, and the feedback control of the engagement/release timing of the brakes B1, B2 is executed by the second feedback control. However, this is not restrictive. The feedback control of the supply current to the second motor-generator 6 may be executed by the second feedback control, and the feedback control of the engagement/release timing of the brakes B1, B2 may be executed by the first feedback control.

Figure 4:
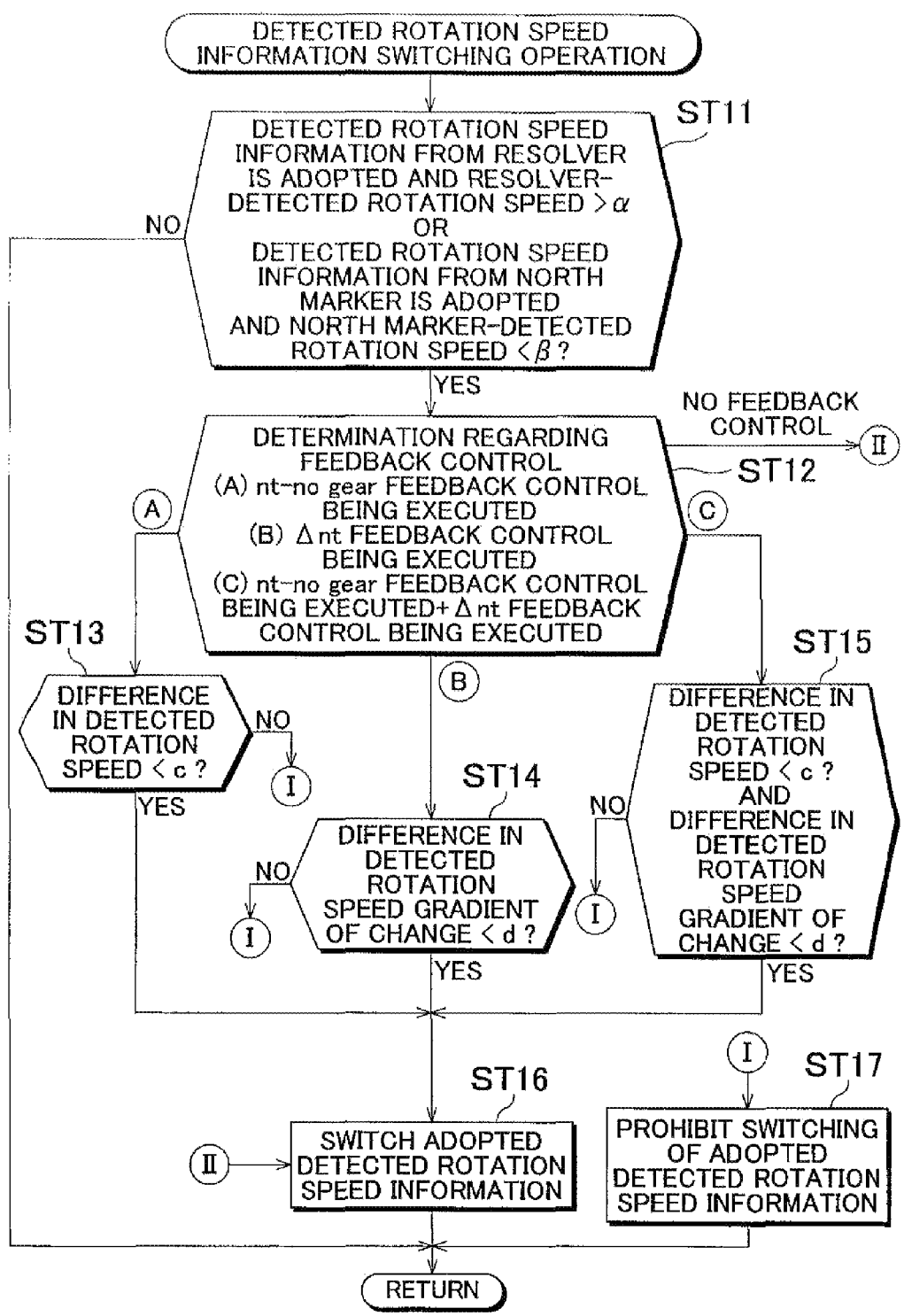
FIG. 4 is a diagram showing a control procedure of the operation of switching the detected rotation speed information in a second embodiment.

Next, a control procedure of switching the detected rotation speed information in this embodiment will be described with reference to the flowchart of FIG. 4. The routine shown in FIG. 4 is also executed at every predetermined time, for example, every several milliseconds, after the engine is started.

During the running state of the vehicle, firstly in step ST11, it is determined whether or not it is presently a timing of switching "from a situation where the detected rotation speed information from the resolver 63 is adopted to a situation where the detected rotation speed information from the north marker 64 is adopted" as rotation speed information about the second motor-generator 6 which is adopted for performing the controls or it is presently a timing of switching "from the situation where the detected rotation speed information from the north marker 64 is adopted to the situation where the detected rotation speed information from the resolver 63 is adopted" as the rotation speed information about the second motor-generator 6 that is adopted for performing the controls. Concretely, it is determined whether or not one of the following conditions is satisfied.

(1) Whether or not the detected rotation speed information from the resolver 63 has presently been adopted and the rotation speed of the second motor-generator 6 based on the detected rotation speed information from the resolver 63 is greater than or equal to a predetermined value α (e.g., 1100 rpm); and (2) whether or not the detected rotation speed information from the north marker 64 has presently been adopted and the rotation speed of the second motor-generator 6 based on the detected rotation speed information from the north marker 64 is less than a predetermined value β (e.g., 900 rpm). That is, the foregoing condition (1) is for determining that the timing at which the detected rotation speed information from the north marker 64 is to be adopted has come as the rotation speed of the second motor-generator 6 has risen from a relatively low rotation speed to above the predetermined value α.

On the other hand, the condition (2) is for determining that the timing at which the detected rotation speed information from the resolver 63 is to be adopted has come as the rotation speed of the second motor-generator 6 has declined from a relatively high rotation speed to below the predetermined value β.

If neither one of the conditions is satisfied, this routine is ended. On the other hand, if one of the conditions (1) and (2) is satisfied (YES in step ST11), the process proceeds to step ST12, in which it is determined what feedback control is presently being executed in the hybrid system. That is, in the case where the feedback control of the supply current to the second motor-generator 6 and the feedback control of the engagement/release timing of the brakes B1, B2 are being executed, it is determined which of the three kinds (A, B, C) of feedback controls is being executed. In the flowchart of FIG. 4, the first feedback control (A) is referred to as "nt-nogear feedback control", and the second feedback control (B) is referred to as "Δnt feedback control", and the third feedback control (C) is referred to as "nt-nogear feedback control+Δnt feedback control".

If none of the feedback controls is presently being executed, the process proceeds to step ST16, in which the rotation speed information about the second motor-generator 6 is not prohibited but the operation of switching the detected rotation speed information that is adopted as the rotation speed information about the second motor-generator 6 is performed. That is, in the case where the satisfaction of the condition (1) has been determined, the control is switched to a control operation in which the detected rotation speed information from the north marker 64 is adopted. On the other hand, in the case where the satisfaction of the condition (2) has been determined, the control is switched to a control operation in which the detected rotation speed information from the resolver 63 is adopted.

On another hand, if a feedback control as mentioned above is being executed and the feedback control is the first feedback control (A), the process proceeds to step ST13. In step ST13, the rotation speed of the second motor-generator 6 detected by the resolver 63 and the rotation speed of the second motor-generator 6 detected by the north marker 64 are compared, and it is determined whether or not a difference (absolute value) therebetween is less than a predetermined value c.

If the answer to the determination in step ST13 is YES, that is, if it is determined that the difference between the detected rotation speeds is less than the predetermine value c, the process proceeds to step ST16. In step ST16, the switching operation is not prohibited but the operation of switching the detected rotation speed information that is adopted as the rotation speed information about the second motor-generator 6 is performed. That is, in the case where the satisfaction of the condition (1) has been determined, the control is switched to a control operation in which the detected rotation speed information from the north marker 64 is adopted. On the other hand, in the case where the satisfaction of the condition (2) has been determined, the control is switched to a control operation in which the detected rotation speed information from the resolver 63 is adopted. If in step ST13 the answer to the determination is NO, that is, if it is determined that the difference between the detected rotation speeds is greater than or equal to the predetermined value c, the process proceeds to step ST17, in which the switching operation is prohibited. That is, in the case where the satisfaction of the condition (1) has been determined, the control operation in which the detected rotation speed information from the resolver 63 is adopted is continued despite the satisfaction of the condition (1). On the other hand, in the case where the satisfaction of the condition (2) has been determined, the control operation in which the detected rotation speed information from the north marker 64 is adopted is continued despite the satisfaction of the condition (2).

If it is determined in step ST12 that the feedback control being executed is the second feedback control (B), the process proceeds to step ST14. In step ST14, the gradient of change in the rotation speed of second motor-generator 6 detected by the resolver 63 and the gradient of change in the rotation speed of the second motor-generator 6 detected by the north marker 64 are compared, and it is determined whether or not a difference (absolute value) therebetween is less than a predetermined value d.

If the answer to the determination in step ST14 is YES, that is, if it is determined that the difference between the gradients of change in the detected rotation speeds is less than the predetermined value d, the process proceeds to step ST16. In step ST16, the switching operation is not prohibited but the operation of switching the detected rotation speed information that is adopted as the rotation speed information about the second motor-generator 6 is performed. That is, in the case where the satisfaction of the condition (1) has been determined, the control is switched to a control operation in which the detected rotation speed information from the north marker 64 is adopted. On the other hand, in the case where the satisfaction of the condition (2) has been determined, the control is switched to a control operation in which the detected rotation speed information from the resolver 63 is adopted. If the answer to the determination in step ST14 is NO, that is, if it is determined that the difference between the gradients of change in the detected rotation speeds is greater than or equal to the predetermined value d, the process proceeds to step ST17, in which the switching operation is prohibited. That is, in the case where the satisfaction of the condition (1) has been determined, the control operation in which the detected rotation speed information from the resolver 63 is adopted is continued despite the satisfaction of the condition (1). On the other hand, in the case where the satisfaction of the condition (2) has been determined, the control operation in which the detected rotation speed information from the north marker 64 is adopted is continued despite the satisfaction of the condition (2).

Furthermore, if it is determined in step ST12 that the present feedback control is the third feedback control (C), the process proceeds to step ST15. In step ST15, the rotation speed of the second motor-generator 6 detected by the resolver 63 and the rotation speed of the second motor-generator 6 detected by the north marker 64 are compared, and it is determined whether or not a difference (absolute value) therebetween is less than the predetermined value c. At the same time, the gradient of change in the rotation speed of the second motor-generator 6 detected by the resolver 63 and the gradient of change in the rotation speed of the second motor-generator 6 detected by the north marker 64 are compared, and it is determined whether or not a difference (absolute value) therebetween is less than the predetermined value d.

If the answer to the determination in step ST15 is YES, that is, if it is determined that the difference between the detected rotation speeds is less than the predetermined value c and that the difference between the gradients of change in the detected rotation speeds is less than the predetermined value d, the process proceeds to step ST16. In step ST16, the switching operation is not prohibited but the operation of switching the detected rotation speed information that is adopted as the rotation speed information about the second motor-generator 6 is performed. That is, in the case where the satisfaction of the condition (1) has been determined, the control is switched to a control operation in which the detected rotation speed information from the north marker 64 is adopted. On the other hand, in the case where the satisfaction of the condition (2) has been determined, the control is switched to a control operation in which the detected rotation speed information from the resolver 63 is adopted. If the answer to the determination in step ST15 is NO, that is, if it is determined that the difference between the detected rotation speeds is greater than or equal to the predetermined value c or that the difference between the gradients of change in the detected rotation speeds is greater than or equal to the predetermined value d, the process proceeds to step ST17, in which the switching operation is prohibited. That is, in the case where the satisfaction of the condition (1) has been determined, the control operation in which the detected rotation speed information from the resolver 63 is adopted is continued despite the satisfaction of the condition (1). On the other hand, in the case where the satisfaction of the condition (2) has been determined, the control operation in which the detected rotation speed information from the north marker 64 is adopted is continued despite the satisfaction of the condition (2).

In this manner, in this embodiment, it is determined whether or not to prohibit the switching operation on the basis of the rotation speed or the gradient of change in the rotation speed that is adopted as the present rotation speed information about the second motor-generator 6. Therefore, in this embodiment, too, a sudden change of the rotation speed information about the second motor-generator 6 can be avoided. The switching operation is not performed even if the shifting operation execution timing of the reduction mechanism 7 and the rotation region transition timing substantially coincide with each other. Thus, it does not happen that the rotation speed information about the second motor-generator 6 suddenly changes during the shifting operation. Therefore, a shift shock can be avoided, and good driveability can be obtained.

Other Embodiments

In the foregoing embodiments, the invention is applied to the hybrid vehicle equipped with the two motor-generators 4, 6. However, this invention is not limited to the foregoing constructions. For example, it is also possible to apply the invention to a hybrid vehicle equipped with one motor-generator in which the assist in the vehicle-running drive force is performed by using the motor-generator, or a hybrid vehicle equipped with three or more motor-generators in which at least one of the motor-generators assists in the vehicle-running drive force.

Furthermore, the invention is applicable not only to FR (front engine, rear wheel drive) hybrid vehicles, but also to FF (front engine, front wheel drive) hybrid vehicles and 4WD (4-wheel drive) hybrid vehicles. Besides, the construction of the gear train in the hybrid system is not limited to those described above in conjunction with the embodiments.

Furthermore, although in the foregoing embodiments, the resolver 63 and the north marker 64 are provided as means for detecting the rotation speed of the second motor-generator 6, this is not restrictive. For example, the invention is also applicable to a construction in which three or more rotation speed detectors are provided. In such a construction, two of the three or more rotation speed detectors correspond to the first rotation speed detector and the second rotation speed detector.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

What is claimed is:

1. A power output device comprising:
a prime mover that outputs power;
a speed change mechanism that is capable of switching between a plurality of speed change ratios and that gives an output of the prime mover to a drive shaft after changing the output in speed at a predetermined speed change ratio;
a first rotation speed detector that detects rotation speed of the prime mover;
a second rotation speed detector that detects rotation speed of the prime mover; and
a controller that adopts information about prime mover rotation speed detected by the first rotation speed detector as present prime mover rotation speed information when the rotation speed of the prime mover is in a predetermined low rotation speed region, and that adopts information about the prime mover rotation speed detected by the second rotation speed detector as the present prime mover rotation speed information when the rotation speed of the prime mover is in a predetermined high rotation speed region, and that switches the prime mover rotation speed information adopted from the information about the prime mover rotation speed detected by the first rotation speed detector to the information about the prime mover rotation speed detected by the second rotation speed detector if the rotation speed of the prime mover changes from the low rotation speed region to the high rotation speed region, and that switches the prime mover rotation speed information adopted from the information about the prime mover rotation speed detected by the second rotation speed detector to the information about the prime mover rotation speed detected by the first rotation speed detector if the rotation speed of the prime mover changes from the high rotation speed region to the low rotation speed region,
wherein if a gradient of change in the prime mover rotation speed is greater than or equal to a predetermined value while the information about the prime mover rotation speed detected by one rotation speed detector of the first rotation speed detector and the second rotation speed detector is adopted as the present prime mover rotation speed information, the controller prohibits a switching operation for adopting the information about the prime mover rotation speed detected by the other rotation speed detector as the present prime mover rotation speed information, and continues to adopt the information about the prime mover rotation speed detected by the one rotation speed detector as the present prime mover rotation speed information.

2. The power output device according to claim 1, wherein the prime mover is a motor-generator, and the first rotation speed detector is a resolver, and the second rotation speed detector is a north marker that calculates the rotation speed based on a pulse wave from an electromagnetic pickup that detects a protrusion that is provided on a rotating body.

3. A hybrid vehicle equipped with the power output device according to claim 1, comprising:
   an internal combustion engine that gives a drive force to the drive shaft; and
   a construction in which an assist is provided for vehicle-running drive force by giving the power of the prime mover to the drive shaft via the speed change mechanism.

4. A power output device comprising:
   a prime mover that outputs power;
   a speed change mechanism that is capable of switching between a plurality of speed change ratios and that gives an output of the prime mover to a drive shaft after changing the output in speed at a predetermined speed change ratio;
   a first rotation speed detector that detects rotation speed of the prime mover;
   a second rotation speed detector that detects rotation speed of the prime mover; and
   a controller that adopts information about prime mover rotation speed detected by the first rotation speed detector as present prime mover rotation speed information and performs a driving control of the prime mover based on the present prime mover rotation speed information when the rotation speed of the prime mover is in a predetermined low rotation speed region, and that adopts information about the prime mover rotation speed detected by the second rotation speed detector as the present prime mover rotation speed information and performs the driving control of the prime mover based on the present prime mover rotation speed information when the rotation speed of the prime mover is in a predetermined high rotation speed region, and that switches the prime mover rotation speed information adopted to perform the driving control of the prime mover from the information about the prime mover rotation speed detected by the first rotation speed detector to the information about the prime mover rotation speed detected by the second rotation speed detector if the rotation speed of the prime mover changes from the low rotation speed region to the high rotation speed region, and that switches the prime mover rotation speed information adopted to perform the driving control of the prime mover from the information about the prime mover rotation speed detected by the second rotation speed detector to the information about the prime mover rotation speed detected by the first rotation speed detector if the rotation speed of the prime mover changes from the high rotation speed region to the low rotation speed region,
   wherein if the information about the prime mover rotation speed detected by one rotation speed detector of the first rotation speed detector and the second rotation speed detector is adopted as the present prime mover rotation speed information and the driving control of the prime mover is being performed based on the present prime mover rotation speed information and a gradient of change in the prime mover rotation speed detected by the one rotation speed detector is greater than or equal to a predetermined value, the controller prohibits a switching operation for adopting the information about the prime mover rotation speed detected by the other rotation speed detector as the present prime mover rotation speed information adopted to perform the driving control of the prime mover, and continues to adopt the information about the prime mover rotation speed detected by the one rotation speed detector as the present prime mover rotation speed information to perform the driving control of the prime mover.

5. The power output device according to 4, wherein the prime mover is a motor-generator, and the first rotation speed detector is a resolver, and the second rotation speed detector is a north marker that calculates the rotation speed based on a pulse wave from an electromagnetic pickup that detects a protrusion that is provided on a rotating body.

6. A hybrid vehicle equipped with the power output device according to claim 4, comprising:
   an internal combustion engine that gives a drive force to the drive shaft; and
   a construction in which an assist is provided for vehicle-running drive force by giving the power of the prime mover to the drive shaft via the speed change mechanism.

7. A power output device comprising:
   a prime mover that outputs power;
   a speed change mechanism that is capable of switching between a plurality of speed change ratios and that gives an output of the prime mover to a drive shaft after changing the output in speed at a predetermined speed change ratio;
   a first rotation speed detector that detects rotation speed of the prime mover;
   a second rotation speed detector that detects rotation speed of the prime mover; and
   a controller that adopts information about prime mover rotation speed detected by the first rotation speed detector as present prime mover rotation speed information and performs a ratio shift control of the speed change mechanism based on the present prime mover rotation speed information when the rotation speed of the prime mover is in a predetermined low rotation speed region, and that adopts information about the prime mover rotation speed detected by the second rotation speed detector as the present prime mover rotation speed information and performs the ratio shift control of the speed change mechanism based on the present prime mover rotation speed information when the rotation speed of the prime mover is in a predetermined high rotation speed region, and that switches the prime mover rotation speed information adopted to perform the ratio shift control of the speed change mechanism from the information about the prime mover rotation speed detected by the first rotation speed detector to the information about the prime mover rotation speed detected by the second rotation speed detector if the rotation speed of the prime mover changes from the low rotation speed region to the high rotation speed region, and that switches the prime mover rotation speed information adopted to perform the ratio shift control of the speed change mechanism from the information about the prime mover rotation speed detected by the second rotation speed detector to the information about the prime mover rotation speed detected by the first rotation speed detector if the rotation speed of the prime mover changes from the high rotation speed region to the low rotation speed region,
   wherein if the information about the prime mover rotation speed detected by one rotation speed detector of the first rotation speed detector and the second rotation speed detector is adopted as the present prime mover rotation speed information and the ratio shift control of the speed change mechanism is being performed based on the present prime mover rotation speed information and a gradient of change in the prime mover rotation speed detected by the one rotation speed detector is greater than or equal to a predetermined value, the controller prohibits a switching operation for adopting the information about the prime mover rotation speed detected by the other rotation speed detector as the present prime mover rotation speed information adopted to perform the ratio shift control of the speed change mechanism, and continues to adopt the information about the prime mover rotation speed detected by the one rotation speed detector as the present prime mover rotation speed information to perform the ratio shift control of the speed change mechanism.

8. The power output device according to claim 7, wherein the prime mover is a motor-generator, and the first rotation speed detector is a resolver, and the second rotation speed detector is a north marker that calculates the rotation speed based on a pulse wave from an electromagnetic pickup that detects a protrusion that is provided on a rotating body.

9. A hybrid vehicle equipped with the power output device according to claim 7, comprising:
an internal combustion engine that gives a drive force to the drive shaft; and
a construction in which an assist is provided for vehicle-running drive force by giving the power of the prime mover to the drive shaft via the speed change mechanism.

10. A power output device comprising:
a prime mover that outputs power;
a speed change mechanism that is capable of switching between a plurality of speed change ratios and that gives an output of the prime mover to a drive shaft after changing the output in speed at a predetermined speed change ratio;
a first rotation speed detector that detects rotation speed of the prime mover;
a second rotation speed detector that detects rotation speed of the prime mover; and
a controller that adopts information about prime mover rotation speed detected by the first rotation speed detector as present prime mover rotation speed information when the rotation speed of the prime mover is in a predetermined low rotation speed region, and that adopts information about the prime mover rotation speed detected by the second rotation speed detector as the present prime mover rotation speed information when the rotation speed of the prime mover is in a predetermined high rotation speed region, and that switches the prime mover rotation speed information adopted from the information about the prime mover rotation speed detected by the first rotation speed detector to the information about the prime mover rotation speed detected by the second rotation speed detector if the rotation speed of the prime mover changes from the low rotation speed region to the high rotation speed region, and that switches the prime mover rotation speed information adopted from the information about the prime mover rotation speed detected by the second rotation speed detector to the information about the prime mover rotation speed detected by the first rotation speed detector if the rotation speed of the prime mover changes from the high rotation speed region to the low rotation speed region,
wherein while the information about the prime mover rotation speed detected by one rotation speed detector of the first rotation speed detector and the second rotation speed detector is adopted as the present prime mover rotation speed information, the controller compares the prime mover rotation speed detected by the one rotation speed detector and the prime mover rotation speed detected by the other rotation speed detector, and if a difference between the prime mover rotation speed detected by the one rotation speed detector and the prime mover rotation speed detected by the other rotation speed detector is greater than or equal to a predetermined value, the controller prohibits a switching operation for adopting the information about the prime mover rotation speed detected by the other rotation speed detector as the present prime mover rotation speed information, and continues to adopt the information about the prime mover rotation speed detected by the one rotation speed detector as the present prime mover rotation speed information.

11. The power output device according to claim 10, wherein the prime mover is a motor-generator, and the first rotation speed detector is a resolver, and the second rotation speed detector is a north marker that calculates the rotation speed based on a pulse wave from an electromagnetic pickup that detects a protrusion that is provided on a rotating body.

12. A hybrid vehicle equipped with the power output device according to claim 10, comprising:
an internal combustion engine that gives a drive force to the drive shaft; and
a construction in which an assist is provided for vehicle-running drive force by giving the power of the prime mover to the drive shaft via the speed change mechanism.

13. A power output device comprising:
a prime mover that outputs power;
a speed change mechanism that is capable of switching between a plurality of speed change ratios and that gives an output of the prime mover to a drive shaft after changing the output in speed at a predetermined speed change ratio;
a first rotation speed detector that detects rotation speed of the prime mover;
a second rotation speed detector that detects rotation speed of the prime mover; and
a controller that adopts information about prime mover rotation speed detected by the first rotation speed detector as present prime mover rotation speed information and performs a driving control of the prime mover based on the present prime mover rotation speed information when the rotation speed of the prime mover is in a predetermined low rotation speed region, and that adopts information about the prime mover rotation speed detected by the second rotation speed detector as the present prime mover rotation speed information and performs the driving control of the prime mover based on the present prime mover rotation speed information when the rotation speed of the prime mover is in a predetermined high rotation speed region, and that switches the prime mover rotation speed information adopted to perform the driving control of the prime mover from the information about the prime mover rotation speed detected by the first rotation speed detector to the information about the prime mover rotation speed detected by the second rotation speed detector if the rotation speed of the prime mover changes from the low rotation speed region to the high rotation speed region, and that switches the prime mover rotation speed information adopted to perform the driving control of the prime mover from the information about the prime mover rotation speed detected by the second rotation speed detector to the information about the prime mover rotation speed detected by the first rotation speed detector if the rotation speed of the prime mover changes from the high rotation speed region to the low rotation speed region, wherein while the information about the prime mover rotation speed detected by one rotation speed detector of the first rotation speed detector and the second rotation speed detector is adopted as the present prime mover rotation speed information and the driving control of the prime mover is being performed based on the present prime mover rotation speed information, the controller compares the prime mover rotation speed detected by the one rotation speed detector and the prime mover rotation speed detected by the other rotation speed detector, and if a difference between the prime mover rotation speed detected by the one rotation speed detector and the prime mover rotation speed detected by the other rotation speed detector is greater than or equal to a predetermined value, the controller prohibits a switching operation for adopting the information about the prime mover rotation speed detected by the other rotation speed detector as the present prime mover rotation speed information adopted to perform the driving control of the prime mover, and continues to adopt the information about the prime mover rotation speed detected by the one rotation speed detector as the present prime mover rotation speed information to perform the driving control of the prime mover.

14. The power output device according to claim 13, wherein the prime mover is a motor-generator, and the first rotation speed detector is a resolver, and the second rotation speed detector is a north marker that calculates the rotation speed based on a pulse wave from an electromagnetic pickup that detects a protrusion that is provided on a rotating body.

15. A hybrid vehicle equipped with the power output device according to claim 13, comprising:
an internal combustion engine that gives a drive force to the drive shaft; and
a construction in which an assist is provided for vehicle-running drive force by giving the power of the prime mover to the drive shaft via the speed change mechanism.

16. A power output device comprising:
a prime mover that outputs power;
a speed change mechanism that is capable of switching between a plurality of speed change ratios and that gives an output of the prime mover to a drive shaft after changing the output in speed at a predetermined speed change ratio;
a first rotation speed detector that detects rotation speed of the prime mover;
a second rotation speed detector that detects rotation speed of the prime mover; and
a controller that adopts information about prime mover rotation speed detected by the first rotation speed detector as present prime mover rotation speed information and performs a ratio shift control of the speed change mechanism based on the present prime mover rotation speed information when the rotation speed of the prime mover is in a predetermined low rotation speed region, and that adopts information about the prime mover rotation speed detected by the second rotation speed detector as the present prime mover rotation speed information and performs the ratio shift control of the speed change mechanism based on the present prime mover rotation speed information when the rotation speed of the prime mover is in a predetermined high rotation speed region, and that switches the prime mover rotation speed information adopted to perform the ratio shift control of the speed change mechanism from the information about the prime mover rotation speed detected by the first rotation speed detector to the information about the prime mover rotation speed detected by the second rotation speed detector if the rotation speed of the prime mover changes from the low rotation speed region to the high rotation speed region, and that switches the prime mover rotation speed information adopted to perform the ratio shift control of the speed change mechanism from the information about the prime mover rotation speed detected by the second rotation speed detector to the information about the prime mover rotation speed detected by the first rotation speed detector if the rotation speed of the prime mover changes from the high rotation speed region to the low rotation speed region, wherein while the information about the prime mover rotation speed detected by one rotation speed detector of the first rotation speed detector and the second rotation speed detector is adopted as the present prime mover rotation speed information and the ratio shift control of the speed change mechanism is being performed based on the present prime mover rotation speed information, the controller compares the prime mover rotation speed detected by the one rotation speed detector and the prime mover rotation speed detected by the other rotation speed detector, and if a difference between the prime mover rotation speed detected by the one rotation speed detector and the prime mover rotation speed detected by the other rotation speed detector is greater than or equal to a predetermined value, the controller prohibits a switching operation for adopting the information about the prime mover rotation speed detected by the other rotation speed detector as the present prime mover rotation speed information adopted to perform the ratio shift control of the speed change mechanism, and continues to adopt the information about the prime mover rotation speed detected by the one rotation speed detector as the present prime mover rotation speed information to perform the ratio shift control of the speed change mechanism.

17. The power output device according to claim 16, wherein the prime mover is a motor-generator, and the first rotation speed detector is a resolver, and the second rotation speed detector is a north marker that calculates the rotation speed based on a pulse wave from an electromagnetic pickup that detects a protrusion that is provided on a rotating body.

18. A hybrid vehicle equipped with the power output device according to claim 16, comprising:
an internal combustion engine that gives a drive force to the drive shaft; and
a construction in which an assist is provided for vehicle-running drive force by giving the power of the prime mover to the drive shaft via the speed change mechanism.

19. A power output device comprising:
a prime mover that outputs power;
a speed change mechanism that is capable of switching between a plurality of speed change ratios and that gives an output of the prime mover to a drive shaft after changing the output in speed at a predetermined speed change ratio;

a first rotation speed detector that detects rotation speed of the prime mover;

a second rotation speed detector that detects rotation speed of the prime mover; and a controller that adopts information about prime mover rotation speed detected by the first rotation speed detector as present prime mover rotation speed information when the rotation speed of the prime mover is in a predetermined low rotation speed region, and that adopts information about the prime mover rotation speed detected by the second rotation speed detector as the present prime mover rotation speed information when the rotation speed of the prime mover is in a predetermined high rotation speed region, and that switches the prime mover rotation speed information adopted from the information about the prime mover rotation speed detected by the first rotation speed detector to the information about the prime mover rotation speed detected by the second rotation speed detector if the rotation speed of the prime mover changes from the low rotation speed region to the high rotation speed region, and that switches the prime mover rotation speed information adopted from the information about the prime mover rotation speed detected by the second rotation speed detector to the information about the prime mover rotation speed detected by the first rotation speed detector if the rotation speed of the prime mover changes from the high rotation speed region to the low rotation speed region, wherein while the information about the prime mover rotation speed detected by one rotation speed detector of the first rotation speed detector and the second rotation speed detector is adopted as the present prime mover rotation speed information, the controller compares a gradient of change in the prime mover rotation speed detected by the one rotation speed detector and the gradient of change in the prime mover rotation speed detected by the other rotation speed detector, and if a difference between the gradient of change in the prime mover rotation speed detected by the one rotation speed detector and the gradient of change in the prime mover rotation speed detected by the other rotation speed detector is greater than or equal to a predetermined value, the controller prohibits a switching operation for adopting the information about the prime mover rotation speed detected by the other rotation speed detector as the present prime mover rotation speed information, and continues to adopt the information about the prime mover rotation speed detected by the one rotation speed detector as the present prime mover rotation speed information.

20. The power output device according to claim 19, wherein the prime mover is a motor-generator, and the first rotation speed detector is a resolver, and the second rotation speed detector is a north marker that calculates the rotation speed based on a pulse wave from an electromagnetic pickup that detects a protrusion that is provided on a rotating body.

21. A hybrid vehicle equipped with the power output device according to claim 19, comprising:

an internal combustion engine that gives a drive force to the drive shaft; and a construction in which an assist is provided for vehicle-running drive force by giving the power of the prime mover to the drive shaft via the speed change mechanism.

22. A power output device comprising:

a prime mover that outputs power;

a speed change mechanism that is capable of switching between a plurality of speed change ratios and that gives an output of the prime mover to a drive shaft after changing the output in speed at a predetermined speed change ratio;

a first rotation speed detector that detects rotation speed of the prime mover;

a second rotation speed detector that detects rotation speed of the prime mover; and a controller that adopts information about prime mover rotation speed detected by the first rotation speed detector as present prime mover rotation speed information and performs a driving control of the prime mover based on the present prime mover rotation speed information when the rotation speed of the prime mover is in a predetermined low rotation speed region, and that adopts information about the prime mover rotation speed detected by the second rotation speed detector as the present prime mover rotation speed information and performs the driving control of the prime mover based on the present prime mover rotation speed information when the rotation speed of the prime mover is in a predetermined high rotation speed region, and that switches the prime mover rotation speed information adopted to perform the driving control of the prime mover from the information about the prime mover rotation speed detected by the first rotation speed detector to the information about the prime mover rotation speed detected by the second rotation speed detector if the rotation speed of the prime mover changes from the low rotation speed region to the high rotation speed region, and that switches the prime mover rotation speed information adopted to perform the driving control of the prime mover from the information about the prime mover rotation speed detected by the second rotation speed detector to the information about the prime mover rotation speed detected by the first rotation speed detector if the rotation speed of the prime mover changes from the high rotation speed region to the low rotation speed region, wherein while the information about the prime mover rotation speed detected by one rotation speed detector of the first rotation speed detector and the second rotation speed detector is adopted as the present prime mover rotation speed information and the driving control of the prime mover is being performed based on the present prime mover rotation speed information, the controller compares a gradient of change in the prime mover rotation speed detected by the one rotation speed detector and the gradient of change in the prime mover rotation speed detected by the other rotation speed detector, and if a difference between the gradient of change in the prime mover rotation speed detected by the one rotation speed detector and the gradient of change in the prime mover rotation speed detected by the other rotation speed detector is greater than or equal to a predetermined value, the controller prohibits a switching operation for adopting the information about the prime mover rotation speed detected by the other rotation speed detector as the present prime mover rotation speed information adopted to perform the driving control of the prime mover, and continues to adopt the information about the prime mover rotation speed detected by the one rotation speed detector as the present prime mover rotation speed information to perform the driving control of the prime mover.

23. The power output device according to claim 22, wherein the prime mover is a motor-generator, and the first rotation speed detector is a resolver, and the second rotation speed detector is a north marker that calculates the rotation speed based on a pulse wave from an electromagnetic pickup that detects a protrusion that is provided on a rotating body.

24. A hybrid vehicle equipped with the power output device according to claim 22, comprising:
an internal combustion engine that gives a drive force to the drive shaft; and
a construction in which an assist is provided for vehicle-running drive force by giving the power of the prime mover to the drive shaft via the speed change mechanism.

25. A power output device comprising:
a prime mover that outputs power;
a speed change mechanism that is capable of switching between a plurality of speed change ratios and that gives an output of the prime mover to a drive shaft after changing the output in speed at a predetermined speed change ratio;
a first rotation speed detector that detects rotation speed of the prime mover;
a second rotation speed detector that detects rotation speed of the prime mover; and
a controller that adopts information about prime mover rotation speed detected by the first rotation speed detector as present prime mover rotation speed information and performs a ratio shift control of the speed change mechanism based on the present prime mover rotation speed information when the rotation speed of the prime mover is in a predetermined low rotation speed region, and that adopts information about the prime mover rotation speed detected by the second rotation speed detector as the present prime mover rotation speed information and performs the ratio shift control of the speed change mechanism based on the present prime mover rotation speed information when the rotation speed of the prime mover is in a predetermined high rotation speed region, and that switches the prime mover rotation speed information adopted to perform the ratio shift control of the speed change mechanism from the information about the prime mover rotation speed detected by the first rotation speed detector to the information about the prime mover rotation speed detected by the second rotation speed detector if the rotation speed of the prime mover changes from the low rotation speed region to the high rotation speed region, and that switches the prime mover rotation speed information adopted to perform the ratio shift control of the speed change mechanism from the information about the prime mover rotation speed detected by the second rotation speed detector to the information about the prime mover rotation speed detected by the first rotation speed detector if the rotation speed of the prime mover changes from the high rotation speed region to the low rotation speed region,
wherein while the information about the prime mover rotation speed detected by one rotation speed detector of the first rotation speed detector and the second rotation speed detector is adopted as the present prime mover rotation speed information and the ratio shift control of the speed change mechanism is being performed based on the present prime mover rotation speed information, the controller compares a gradient of change in the prime mover rotation speed detected by the one rotation speed detector and the gradient of change in the prime mover rotation speed detected by the other rotation speed detector, and if a difference between the gradient of change in the prime mover rotation speed detected by the one rotation speed detector and the gradient of change in the prime mover rotation speed detected by the other rotation speed detector is greater than or equal to a predetermined value, the controller prohibits a switching operation for adopting the information about the prime mover rotation speed detected by the other rotation speed detector as the present prime mover rotation speed information adopted to perform the ratio shift control of the speed change mechanism, and continues to adopt the information about the prime mover rotation speed detected by the one rotation speed detector as the present prime mover rotation speed information to perform the ratio shift control of the speed change mechanism.

26. The power output device according to claim 25, wherein the prime mover is a motor-generator, and the first rotation speed detector is a resolver, and the second rotation speed detector is a north marker that calculates the rotation speed based on a pulse wave from an electromagnetic pickup that detects a protrusion that is provided on a rotating body.

27. A hybrid vehicle equipped with the power output device according to claim 25, comprising:
an internal combustion engine that gives a drive force to the drive shaft; and
a construction in which an assist is provided for vehicle-running drive force by giving the power of the prime mover to the drive shaft via the speed change mechanism.

* * * * *